(12) United States Patent
Kazarian

(10) Patent No.: US 6,486,868 B1
(45) Date of Patent: *Nov. 26, 2002

(54) TWO-HANDED INPUT CONTROL APPARATUS AND METHOD

(76) Inventor: Randal N. Kazarian, P.O. Box 40629, Santa Barbara, CA (US) 93140

( * ) Notice: Subject to any disclaimer, the term of this patent is extended or adjusted under 35 U.S.C. 154(b) by 0 days.

This patent is subject to a terminal disclaimer.

(21) Appl. No.: 09/349,838

(22) Filed: Jul. 8, 1999

Related U.S. Application Data

(63) Continuation-in-part of application No. 08/754,680, filed on Nov. 21, 1996, now Pat. No. 5,949,401.

(51) Int. Cl.⁷ .................................................. G09G 5/00
(52) U.S. Cl. ........................ 345/156; 345/161; 345/163; 345/167; 345/168
(58) Field of Search .............................. 345/156, 157, 345/163, 161, 167, 168, 173

(56) References Cited

U.S. PATENT DOCUMENTS

| | | | |
|---|---|---|---|
| 3,936,026 A | | 2/1976 | Hampel et al. |
| 4,424,947 A | | 1/1984 | Adams et al. |
| 4,458,238 A | | 7/1984 | Learn |
| 4,604,502 A | * | 8/1986 | Thomas ..................... 200/6 A |
| 4,748,441 A | * | 5/1988 | Brzezinski .................. 345/161 |
| 4,850,880 A | | 7/1989 | Zayat, Jr. et al. |
| 4,927,364 A | | 5/1990 | Inui et al. |
| 4,933,670 A | | 6/1990 | Wislocki |
| 4,952,919 A | | 8/1990 | Nippoldt |
| 5,063,289 A | | 11/1991 | Jasinski et al. |
| 5,063,376 A | | 11/1991 | Chang |
| 5,260,696 A | | 11/1993 | Maynard, Jr. |
| 5,280,276 A | | 1/1994 | Kwok |
| 5,287,090 A | | 2/1994 | Grant |
| 5,296,871 A | | 3/1994 | Paley |
| 5,298,919 A | | 3/1994 | Chang |
| 5,313,230 A | | 5/1994 | Venolia et al. |
| 5,334,997 A | | 8/1994 | Scallon |
| 5,339,097 A | | 8/1994 | Grant |
| 5,379,054 A | | 1/1995 | Tanaka et al. |
| 5,426,449 A | | 6/1995 | Danziger |
| 5,457,480 A | | 10/1995 | White |
| 5,512,892 A | | 4/1996 | Corballis et al. |
| 5,551,693 A | | 9/1996 | Goto et al. |
| 5,563,631 A | | 10/1996 | Masunaga |

* cited by examiner

Primary Examiner—Bipin Shalwala
Assistant Examiner—Ricardo Osorio
(74) Attorney, Agent, or Firm—Leo F. Costello

(57) ABSTRACT

An apparatus and method for inputting data including controls to a computer, or other equipment, such as for CAD, three-dimensional (3D) modeling and animation systems and for motion control. Included are a two-handed, hand-held apparatus and a method for inputting data, including alpha-numeric information and control signals, while using the apparatus. The apparatus includes a plurality of input and/or control devices, each having input elements for inputting data to a computer or other equipment by the transmission of signals to such computer or equipment, and a pair of holders that mount the input devices and have holding portions and hand resting portions. The holders are releasably joined in back-to-back relation by a connector mechanism that allows the holders to be individually held in free space by and between the two hands of a user. The apparatus can be used in any position but the preferred method of use involves turning or rotating the hands so that a selected input device is positioned on top in a convenient position for manipulation by the uppermost hand while it rests on the uppermost holder and while the entire apparatus is being supported by the lowermost hand. More specifically, the connector mechanism pivotally interconnects the holders for movement about a fixed axis and has features which enable the holders and their input devices to be separated from the apparatus so that they can be interchanged with other holders mounting different input devices. In addition, the holders are mounted for pivoting movement about a second axis in angular relation to the first axis.

44 Claims, 17 Drawing Sheets

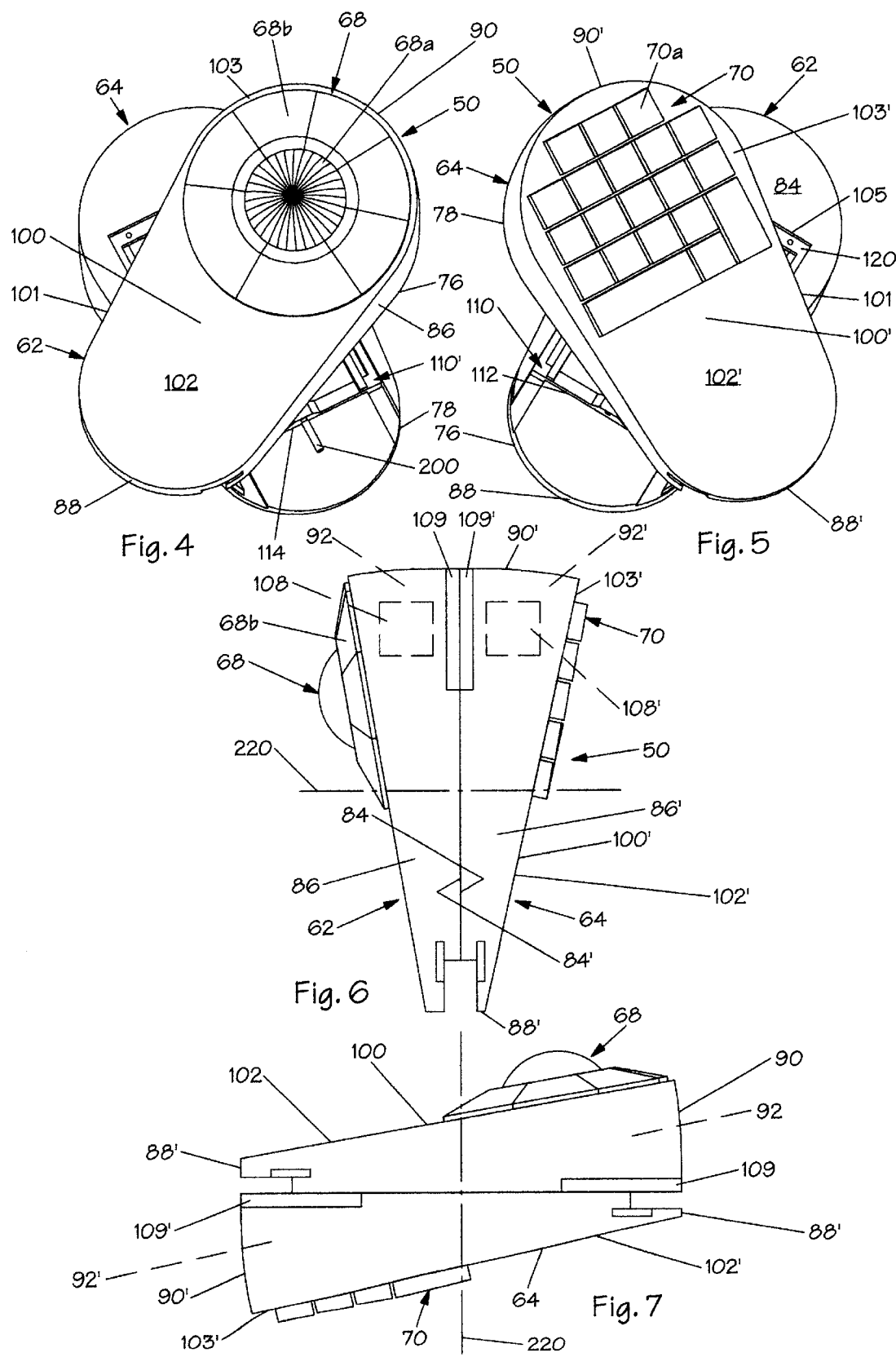

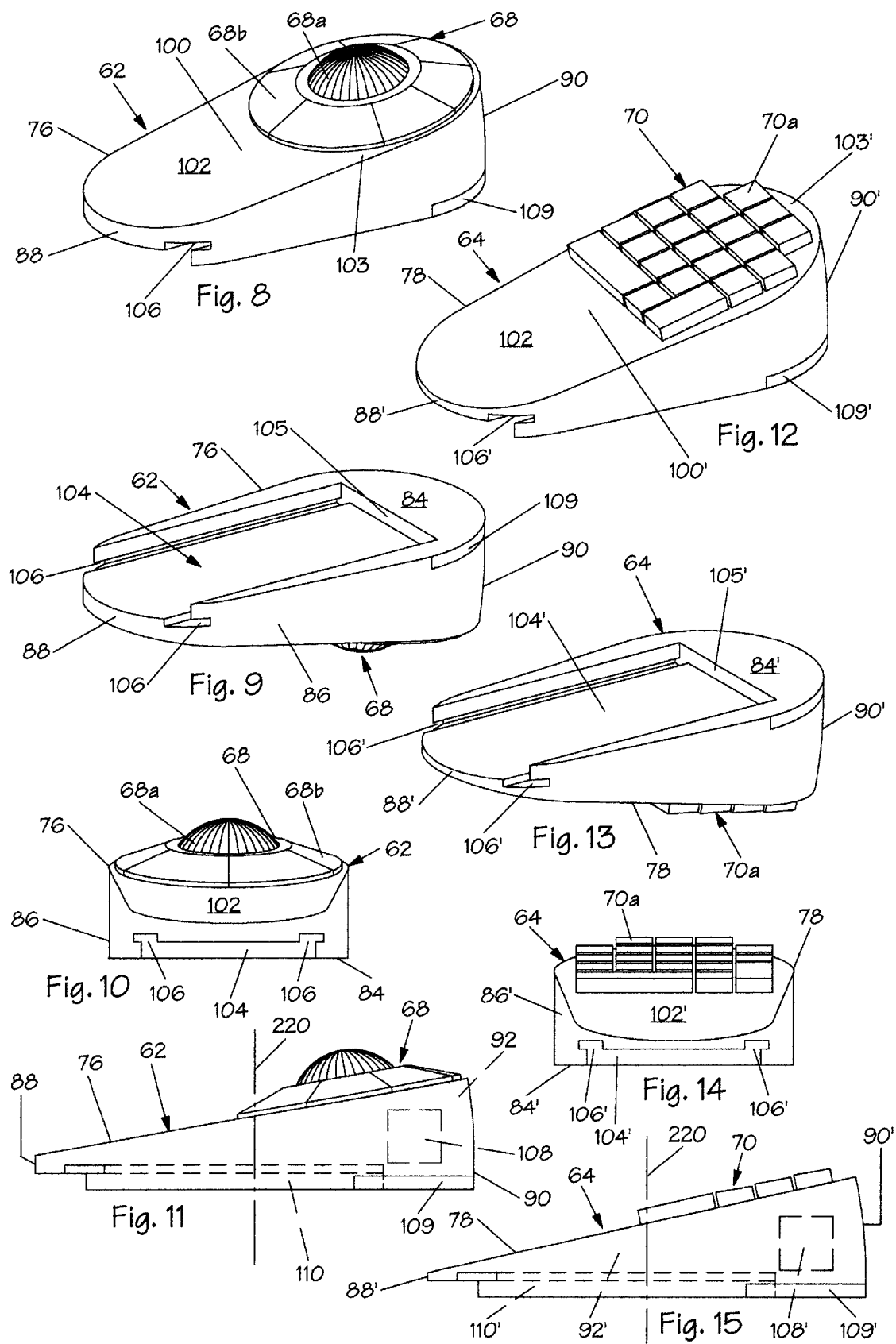

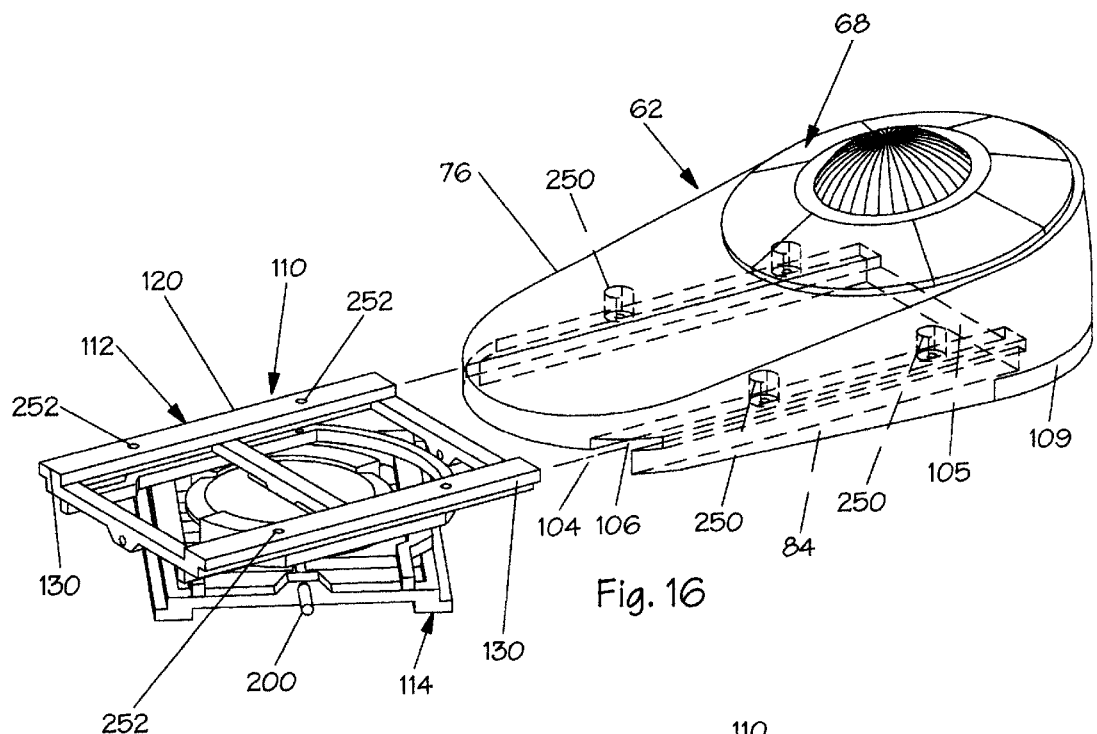
Fig. 16
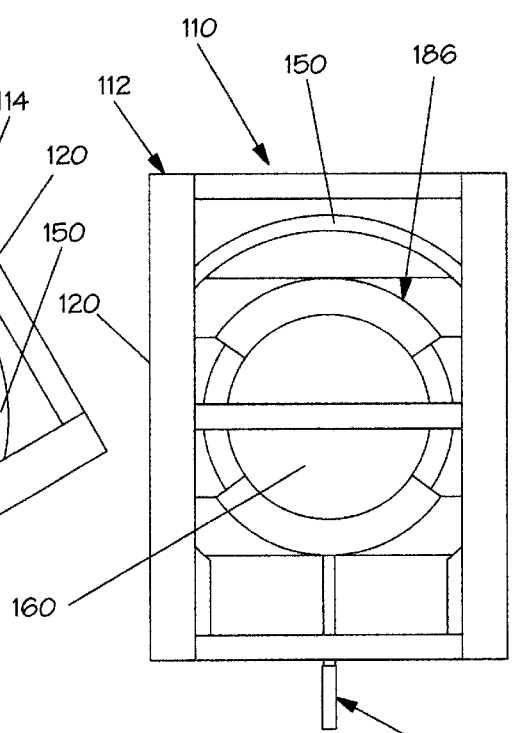
Fig. 17
Fig. 18

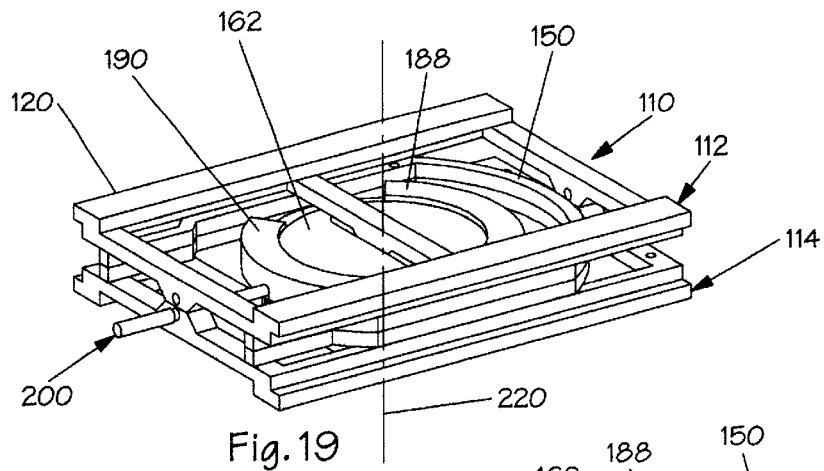
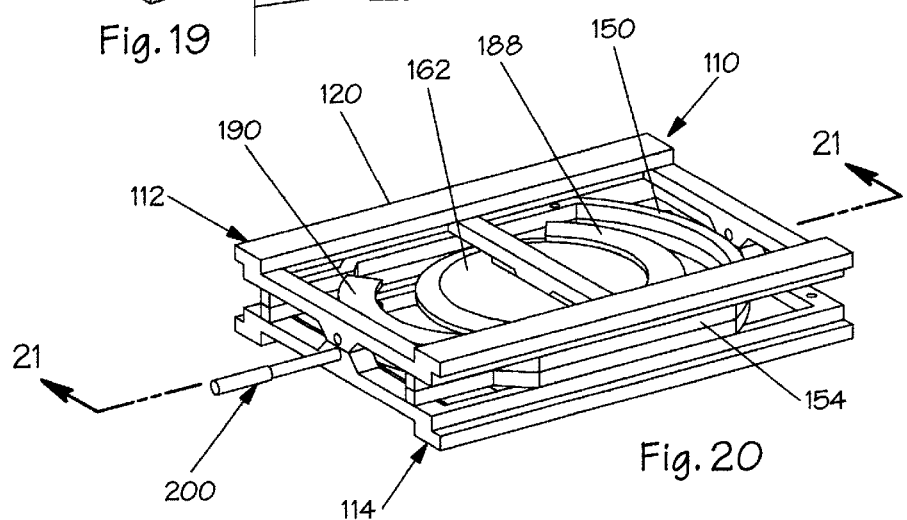
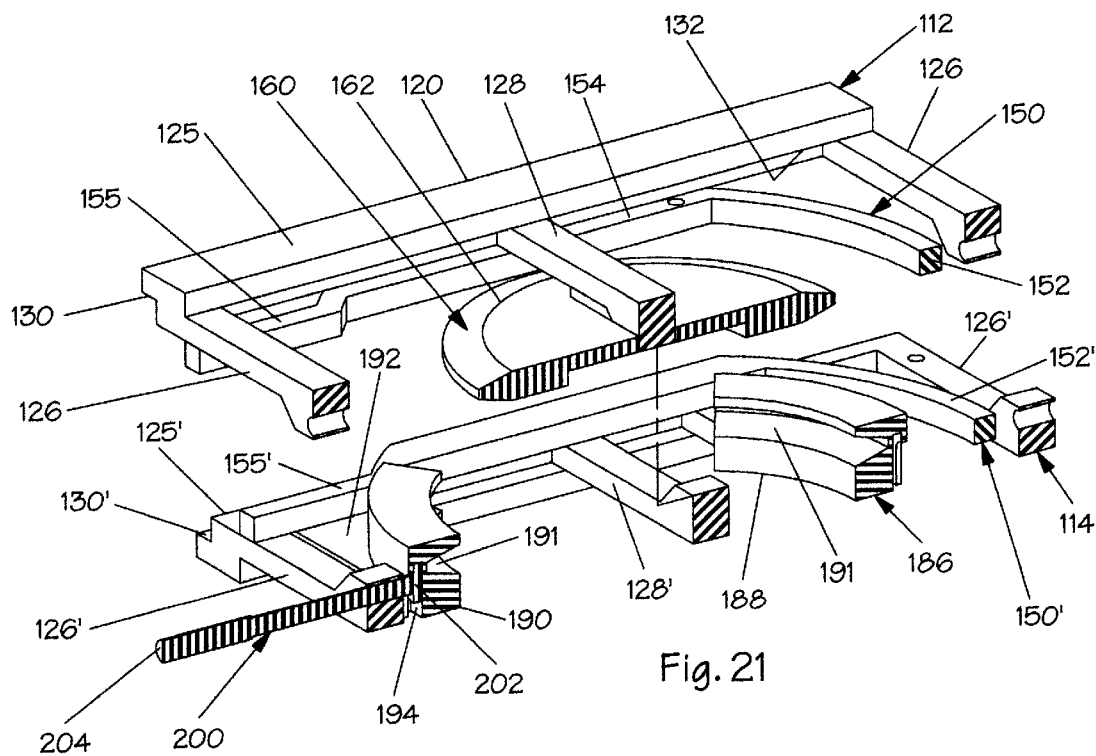

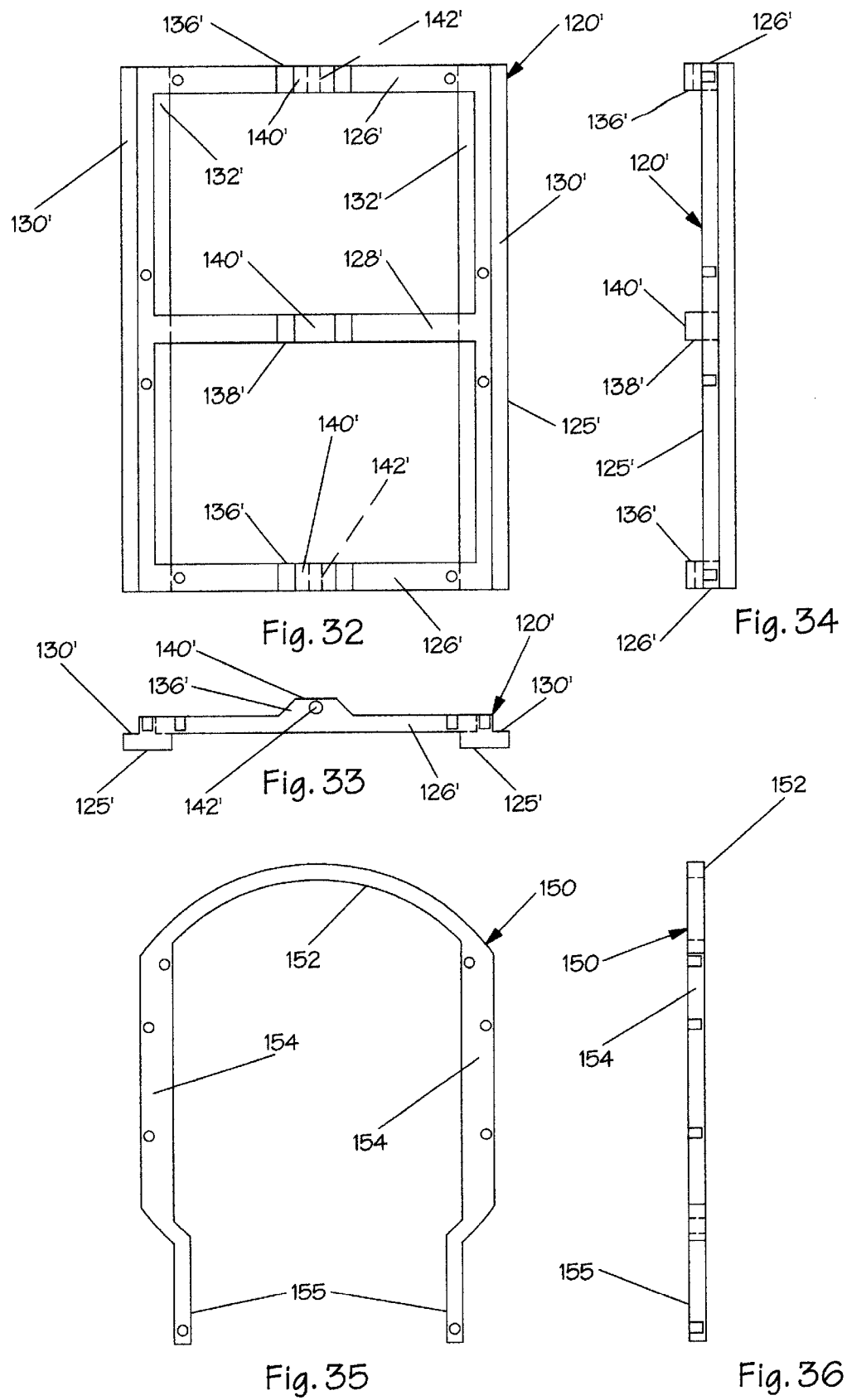

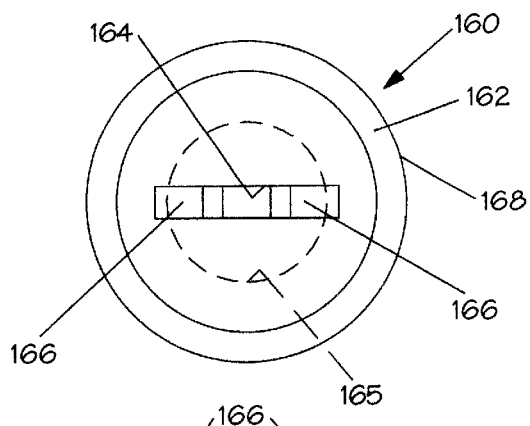
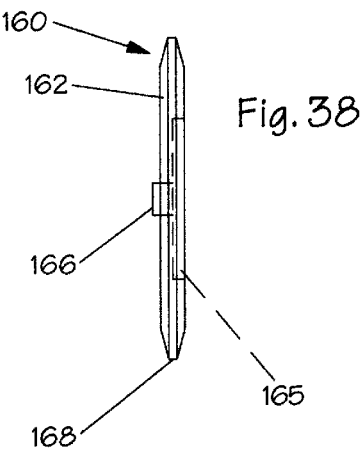
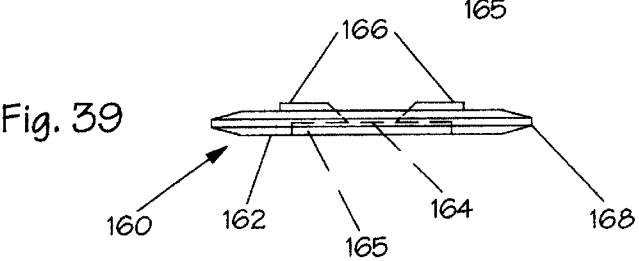
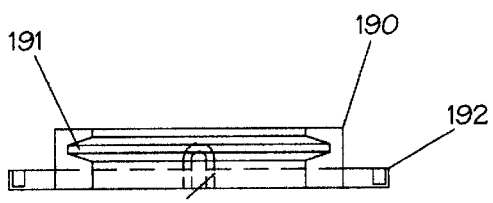
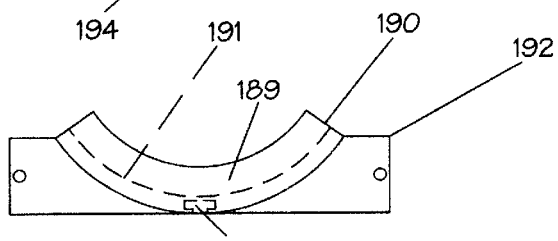
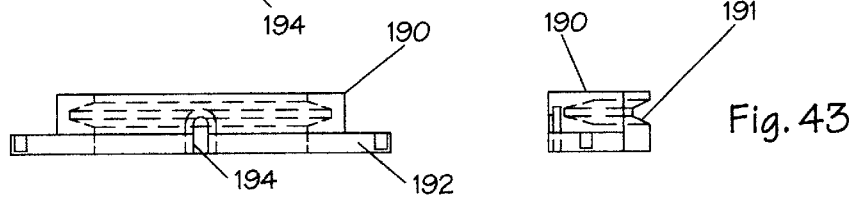
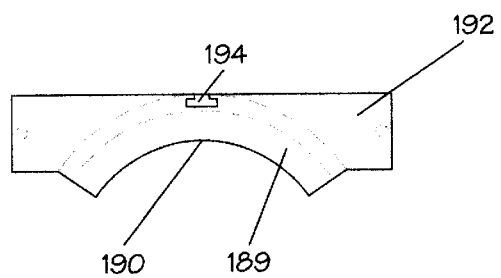

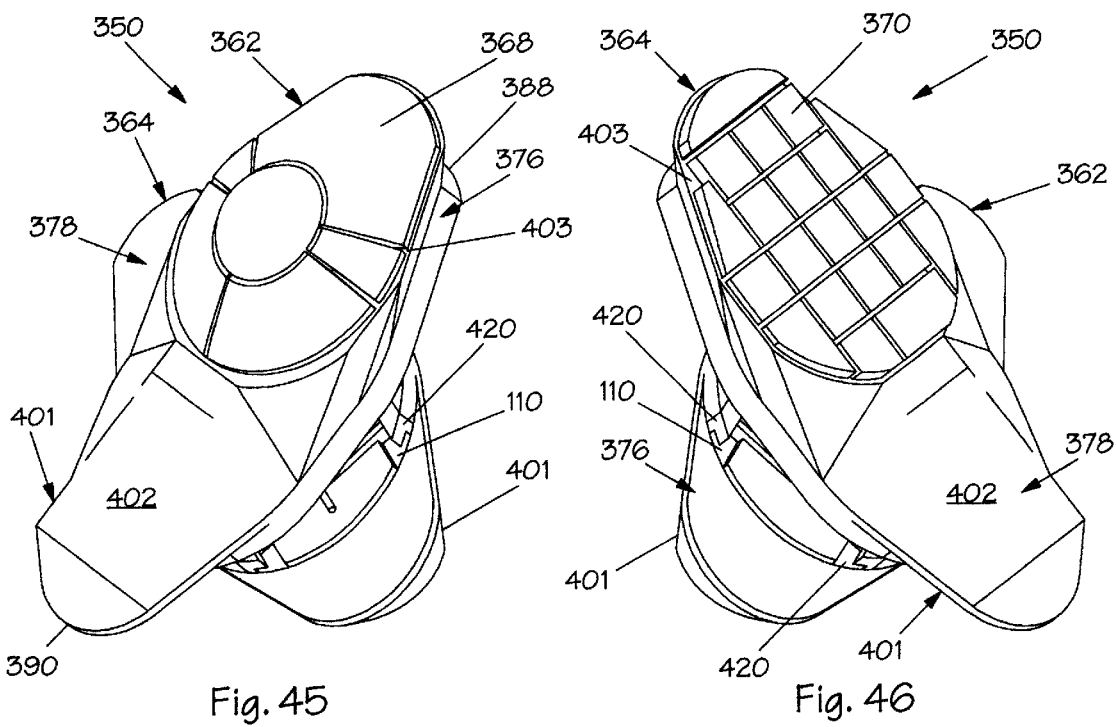
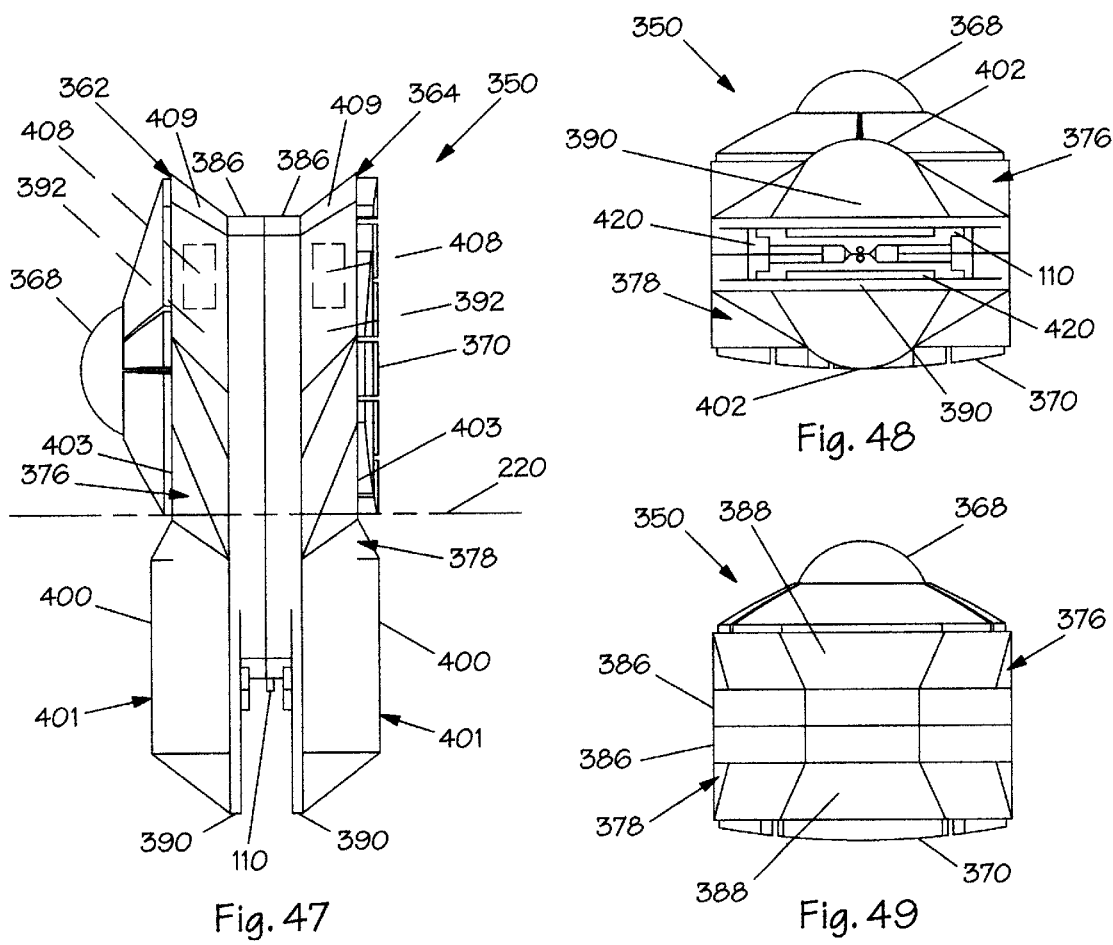

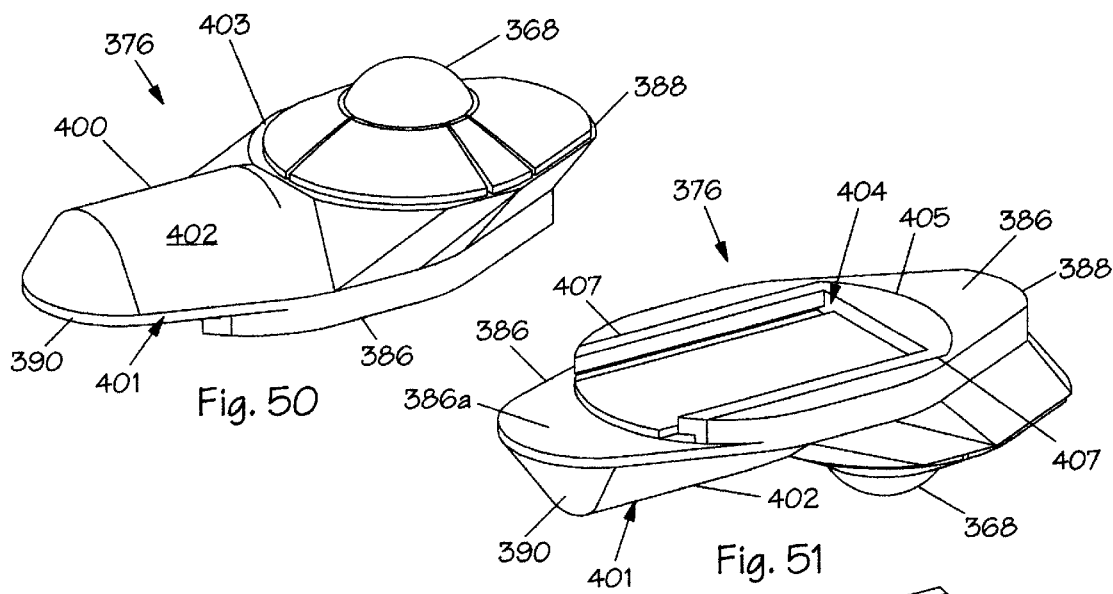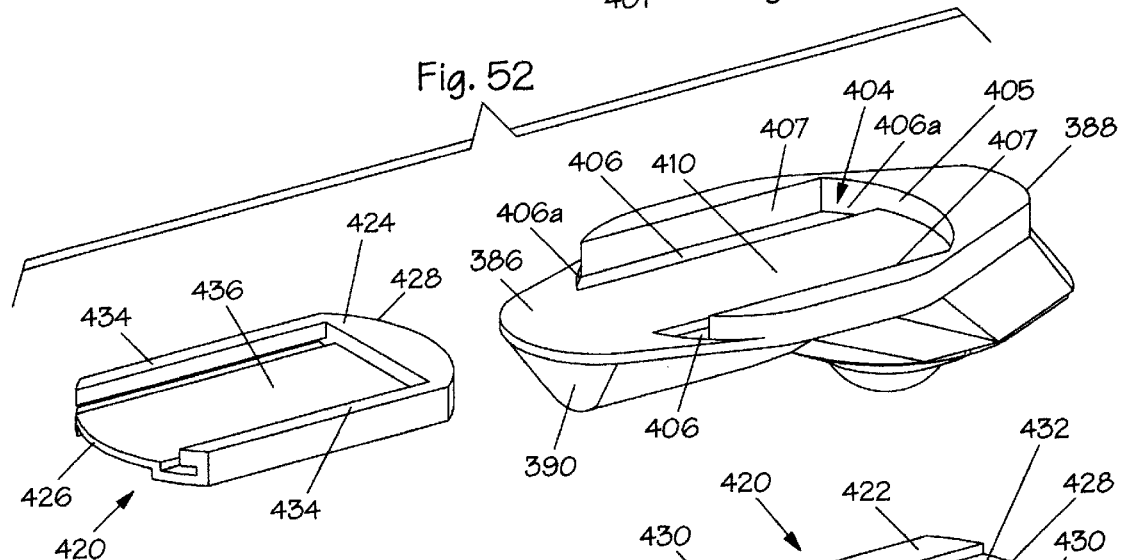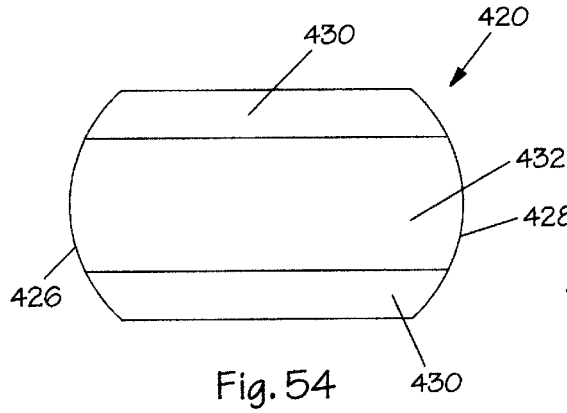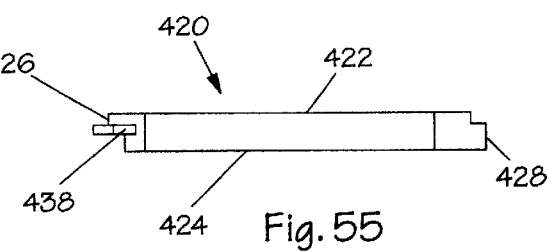

TWO-HANDED INPUT CONTROL APPARATUS AND METHOD

RELATED APPLICATION

This application is a continuation-in-part of my application Ser. No. 08/754,680 filed Nov. 21, 1996 now U.S. Pat. No. 5,949,401, entitled Two-Handed Input Apparatus and Method, which in its entirety is incorporated by reference herein.

FIELD

The present invention pertains to a two-handed, input control apparatus and method and more particularly to an apparatus for mounting and manipulating input control devices that is held in and manipulated by both hands of a user and to method of using the apparatus.

BACKGROUND

In operating CAD, three-dimensional (3D) modeling and animation systems and for motion control. an operator conventionally inputs data into the system through multiple input devices such as a keyboard, a finger touch-tablet, a trackball, a joystick, a mouse, or 3D input devices. A typical workstation or other set-up for a CAD or 3D system uses several of such single-handed, single purpose, input devices in front of at least one monitor, all located on a desktop. Most computer users combine a traditional two-handed keyboard with a one-handed mouse, trackball, or touch pad pointing device to control placement of that data on the screen. In use of such systems, the operator's principle focus is on the monitor but at the same time, in order to enter data, the operator must move his or her hand from one input device to another. Accordingly, the hand must be continually repositioned on various input devices, requiring the operator to look away from the monitor and at the device to be used.

Such shifting of the eyes between the display and various input devices when using such modeling and animation systems, and other computer equipment causes the user to break his concentration on the work-in-progress. Having to remove one's eyes from the screen, to look instead at the next input device to-be-used while the next input is made, and then to look back at the screen and find the point on the display affected by the input, to confirm its entry, is distracting, time-consuming, inefficient, prone to error, and tiring. The foregoing modus operandi is exacerbated by the increasing need to input multi-dimensional spatial data, such as 3D information, requiring in itself multiple input devices. such as disclosed in U.S. Pat. No. 5,298,919 to Chang and U.S. Pat. No. 5,313,230 to Venolia et al.

In addition, the conventional input devices for 3D CAD systems force an operator to sit in a relatively fixed position in front of a desk. It is well established that the use of even just one computer input device, such as a keyboard or pad, on a desktop can cause several different types of muscle strain on the user. As such, the described inputting method with multiple devices adds to the normal fatigue, discomfort, and other ergonomic problems associated with working at a desk top.

Improvements have been proposed to overcome some of the problems with desktop input devices. For example, a single handed. hand-held input device has been proposed in NASA Tech Brief, Vol. 16, No. 11, Item #64, from JPL New Technology Report NPO-110231/7740, entitled *Portable Computer Keyboard for Use With One Hand,* by G. Friedman dated November 1992. The Friedman device is a hand-held, egg-shaped input device providing seven keys for the entry of normal keyboard data in place of a standard computer keyboard. Although this device does not require a desktop for its use, it is not suited to mount input devices of the various types necessary for CAD, 3D modeling and animation operation. Moreover. it must be grasped by the same hand that inputs the data and at the same time as the keys are being manipulated, a possible source of stress on the hand involved. The single hand, hand-held input devices in U.S. Pat. Nos. 5,063,376 to Chang and 5,296,871 to Paley are subject to the same limitations as the Friedman device.

Apart from operating CAD, 3D systems and other computer equipment, various electrical, optical, or electro-optical equipment, with or without motion-control, use input devices providing keypads, joysticks, dials, switches, and other control elements. For example, a television set, a VCR, a CD player, an amplifier, or other stereo equipment typically has its own remote control device. Although some integration of controls for different appliances has occurred, particularly as between a TV and a VCR, it is not uncommon to use three or four separate remote controls for the typical TV, VCR, and stereo equipment in many households. Such remote control devices are single purpose input devices that are used in free space and require two hands to operate. That is, the user must pick up the control, hold it in one hand, manipulate the buttons or other control elements with the free hand. and then set the control down before picking up a second input device to be operated.

Unitary joysticks, such as shove in U.S. Pat. No. 5,630, 756, are typically used for motion control, such as for flight-simulation, computer games. and virtual reality environments, but also for actual flight of manned or unmanned air, land, water or space vehicles. Such known joysticks do not allow for optimum interaction and control and thus have limitations for modern usage in these environments.

SUMMARY

An apparatus and method are provided for inputting data including control signals to a computer or other equipment, such as for CAD), three-dimensional (3D) modeling and animation systems and for motion control. Included are a two-handed, hand-held apparatus and a method for inputting data, including alpha-numeric information and control signals, while using the apparatus. The apparatus includes a plurality of input and/or control devices, each having input elements for inputting data including signals to a computer or other equipment by the transmission of signals to such computer or equipment, and a pair of holders that mount the input devices and have holding portions and hand resting portions. The holders are releasably joined in back-to-back relation by a connector mechanism that allows the holders to be individually held in free space by and between the two hands of a user. The apparatus can be used in any position but the preferred method of use involves turning, rotating and/or pivoting the hands. In one mode of use, the hands are turned or rotated so that a selected input device is positioned on top in a convenient position for manipulation by the uppermost hand while it rests on the uppermost holder and while the entire apparatus is being supported by the lowermost hand. In another mode of use, the hands are rotated and pivoted so as to move the input devices toward and away from each other. More specifically, the connector mechanism pivotally interconnects the holders for movement about a fixed axis and has features which enable the holders and their input devices to be separated from the apparatus so that they can be interchanged with other holders mounting different input devices. In addition, the holders are mounted for pivoting movement about a second axis in angular relation to the first axis.

An object of this invention is to provide a two-handed, hand-held input control apparatus.

Another object is to provide a method of operating a two-handed. hand-held input control apparatus.

A further object is to enable a computer system, such as a CAD, 3D modeling and animation system or workstation, or other equipment to be operated or controlled with multiple input devices, while allowing the equipment, or the work in progress on a display of the equipment, to be continuously viewed so that the user does not have to look away from the equipment or its display.

A still further object is to enable the motion of an object in either a virtual reality or actual environment to be operated or controlled with a two-handed. hand-held input control apparatus.

Another object is to improve the efficiency of controlling equipment, such as inputting data and/or signals into a computer or other equipment. by enabling the user to rapidly switch from one input or other controlling device to another while minimizing the possibility of committing errors in manipulating the controlling devices.

An additional object is to control equipment, by inputting data or other controls, by using both hands of a user wherein one hand and then the other alternately serves as a support while the remaining hand manipulates controlling elements or wherein both hands can simultaneously support and manipulate controlling elements, and in any case, neither hand has to move away from its controlling elements to another set of controlling elements.

A further object is to provide an apparatus that is operated in free space by and between both hands of a user for inputting data including controls into a computer or other equipment or otherwise controlling the same.

An additional object is to enable a computer system or other equipment to be operated or controlled while in a user-selected posture that is more natural, comfortable and less fatiguing, as contrasted with being required to sit in a particular posture at a desk.

Yet another object is to enable equipment such as a computer system or television or other equipment to be operated by users unable to be seated, such as those who are bedridden or handicapped, or by those who wish to stand while operating the equipment.

A further object is remove certain input devices from a computer desktop and thereby provide more desk space around the computer.

A still further object is to provide a portable control for a computer system or other equipment so that the system can be operated while sitting, standing, lying down, or moving around in various positions in the near vicinity of the computer monitor but not confined to a sitting position immediately in front of the monitor for the system or equipment.

Yet an additional object is to provide an apparatus for inputting data or controlling equipment with multiple input devices that allows the pre-assembly of dedicated input devices or is modular and allows several different types of input devices to be interchanged.

Still another object is to provide a hand-operated control of the type described that is ergonomically shaped to hand contours and is thus comfortable to hold and use and which in addition can be operated equally well by right-handed or left-handed users.

An additional object is to reduce the likelihood of errors in the operation of CAD, 3D modeling and animation systems, workstations, or other computer or motion control systems.

Yet another object is to integrate a plurality of input devices on a common apparatus so that data can be entered from selected input devices while holding the apparatus in and between the hands of the operator.

Still another object is to obviate the need for multiple separate, single-use remote controls for a TV, VCR, stereo, or other appliances, wherein the user picks up one control. manulates it to operate one appliance, and sets it down, and then repeats the process with other controls and appliances.

Another object is releasably to interconnect a pair of hand-held holders mounting input control devices that allows the holders, while being held by and between the user's two hands, to be pivoted relative to each other about a first axis by simultaneously rotating the hands alternately clockwise and counterclockwise about the longitudinal axes of their respective arms and simultaneously or independently to allow the holders to be pivoted about a second axis by tilting the hands like seesaws or teeter-totters toward and away from each other.

Still another object is to enable input devices, that are mounted on a two-handed, hand-held apparatus, to be interchanged with other input devices.

An additional object is to provide a two-handed, hand-held apparatus for mounting and manipulating a plurality of input devices that will accept various input devices, including but not limited to buttons, a keyboard (standard. numeric or one-handed), a digitizing or graphics or finger touchtablet, a trackball, a joystick, multi-dimensional input devices such as 3D input devices for inputting multi-dimensional spatial data, or any combination of miscellaneous controller devices such as those used for remote control of televisions, VCRs, stereos, and/or robotics or motion control in general.

Yet a further object is to provide a control with multiple input devices that is operated by and between the two hands of a user that enables the user to rapidly switch from one input device to the another by merely rotating the hands and wrists thereby to place a selected input device in a convenient operating position or to rapidly input signals for motion control merely by rotating the hands and arms and/or by tilting the hands and wrists.

A further object is to provide a mechanism for pivotally interconnecting two parts or devices, or one part on another part, so that the parts or devices are supported relative to each other in a stable manner throughout a three hundred sixty degree range of pivoting motion.

Still another object is to provide such a mechanism for interconnecting multiple units for pivotal movement relative to each other wherein the resistance to pivoting motion is adjustable. yet another object is to provide a mounting mechanism for pivotally interconnecting multiple units wherein the interconnected units can be released from the mechanism for interchange with other units, for maintenance, or for other reasons.

An additional object is to provide an interconnecting mechanism of the type described that is made of relatively few parts of which several are symmetrical duplicates thereby to facilitate molding and automated assembly.

These and other objects, features and advantages of the present invention will become apparent upon reference to the following description, accompanying drawings, and appended claims:

DESCRIPTION OF THE DRAWINGS

FIG. 4 is a perspective view of the subject input apparatus as shown in FIGS. 1–3, but slightly enlarged from FIGS. 1–3, showing one of the input devices on its holder on top and rotated approximately sixty degrees from the input device and its holder on the bottom, similar to the position of the apparatus shown in FIG. 1, and thereby exposing part of the connecting mechanism that pivotally interconnects the holders.

FIG. 5 is a view similar to FIG. 4 but with the holders reversed in position similar to the position of the apparatus shown in FIG. 3.

FIG. 6 is a side elevation of the first embodiment of the subject invention shown with the holders and their input devices in a congruent position similar to that shown in FIG. 2 but slightly enlarged therefrom.

FIG. 7 is also a side elevation of the first embodiment with the holders rotated one hundred eighty degrees relative to each other from the position of FIG. 6 and in a more convenient storage position.

FIG. 8 is a trimetric top view of one of the input devices and its holder as incorporated in the apparatus of FIGS. 1–7.

FIG. 9 is a trimetric bottom view of the holder and device of FIG. 8.

FIG. 10 is an end elevation of the input device and holder as shown in FIG. 8.

FIG. 11 is a side elevation of the holder and input device as shown in FIG. 8.

FIG. 12 is a view similar to FIG. 8 but showing another input device on its holder.

FIG. 13 is a view similar to FIG. 9 but showing the bottom of the holder and input device of FIG. 12.

FIG. 14 is an end elevation of the holder and input device of FIG. 12.

FIG. 15 is a side elevation of the input device and holder of FIG. 12.

FIG. 16 is an exploded trimetric top view of one of the input devices and its holder of the first embodiment and the common connecting mechanism of the present invention, showing the connecting mechanism in a position to be assembled with one of the holders.

FIG. 17 is a top plan view of the connector mechanism shown in FIG. 16 with the coupling units of the connecting mechanism rotated about sixty degrees relative to each other.

FIG. 18 is a top plan view of the connecting mechanism with the connection units in congruent relationship to each other.

FIG. 19 is a trimetric view of the connector mechanism of the present invention showing the female coupling unit in closed or coupled position.

FIG. 20 is a view similar to FIG. 19 with the female coupling unit in open or uncoupled position.

FIG. 21 is an enlarged exploded vertical section taken on line 21—21 in FIG. 20.

FIG. 32 is an enlarged top plan view of the connector frame used in both the male and female coupling units of the subject connecting mechanism as shown in FIG. 19.

FIG. 33 is an end elevation of the frame shown in FIG. 32.

FIG. 34 is side elevation of the frame shown in FIG. 32.

FIG. 35 is an enlarged plan view of the supporting guide incorporated in the male and female coupling units of the subject connecting mechanism as shown in FIG. 19.

FIG. 36 is a side elevation of the supporting guide shown in FIG. 35.

FIG. 37 is an enlarged top plan view of the male coupling disc of the connecting mechanism as shown in FIG. 19.

FIG. 38 is a side elevation of the disc shown in FIG. 37.

FIG. 39 is also a side elevation of the disc shown in FIG. 37 but taken from an angle ninety degrees removed from the position of FIG. 38.

FIG. 40 is an enlarged inside side elevation of the movable coupling shoe of the female coupling unit of the subject connecting mechanism, as shown in FIG. 19.

FIG. 41 is a top plan view of the movable shoe shown in FIG. 40.

FIG. 42 is an outside side elevation of the movable coupling shoe shown in FIGS. 40 and 41.

FIG. 43 is an end elevation of the movable coupling shoe shown in FIG. 42.

FIG. 44 is a bottom plan view of the movable coupling shoe shown in FIG. 41.

FIG. 45 is a view similar to FIG. 4 but showing a second embodiment of the subject apparatus.

FIG. 46 is a view similar to FIG. 5 but showing the second embodiment of FIG. 45.

FIG. 47 is a view similar to FIG. 6 but of the second embodiment of the present invention.

FIG. 48 is an end view of one end of the second embodiment of the present invention.

FIG. 49 is an end view of the opposite end of the second embodiment of the present invention.

FIG. 50 is a view similar to FIG. 8 but of the second embodiment of the present invention.

FIG. 51 is a view similar to FIG. 9 but of the second embodiment of the present invention and thus also showing a coupling adapter or frame receptacle in the holder that forms part of the connector mechanism not only in the second embodiment of the present invention but also in the third embodiment.

FIG. 52 is an exploded view to the coupling adapter removed from but shown aligned with the holder and in a position to be interfitted with the holder.

FIG. 53 is a trimetric view of the coupling adapter alone but inverted from its position as shown in FIGS. 51 and 52.

FIG. 54 is a plan view of the coupling adapter.

FIG. 55 is a side elevation of the coupling adapter shown in FIGS. 53 and 54.

DETAILED DESCRIPTION OF THE FIRST EMBODIMENT

Figure 1:
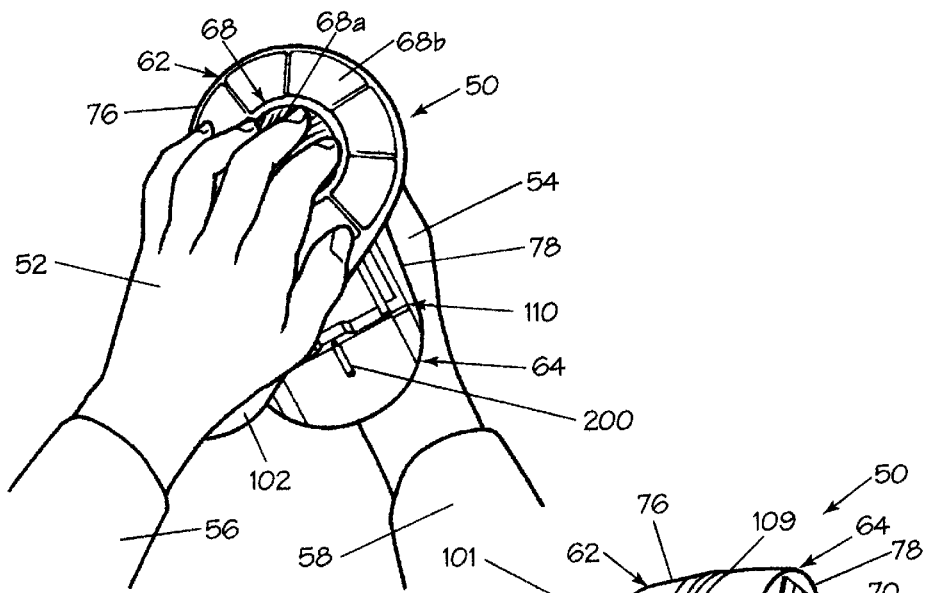
FIGS. 1 through 3 are perspective views of a first embodiment of a two-handed, hand-held input control apparatus of the present invention. with the apparatus shown being held by and between both hands of a user and showing the method of using the apparatus.
Figure 2:
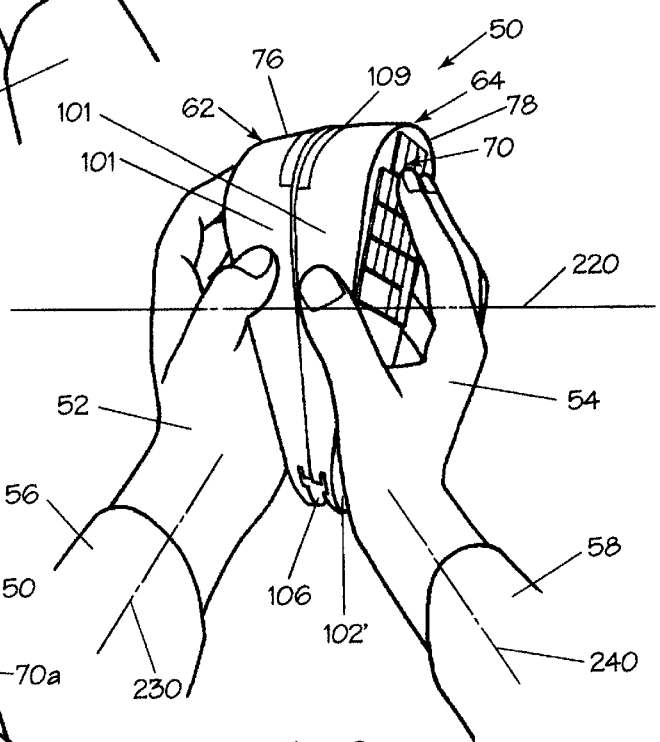
Figure 3:
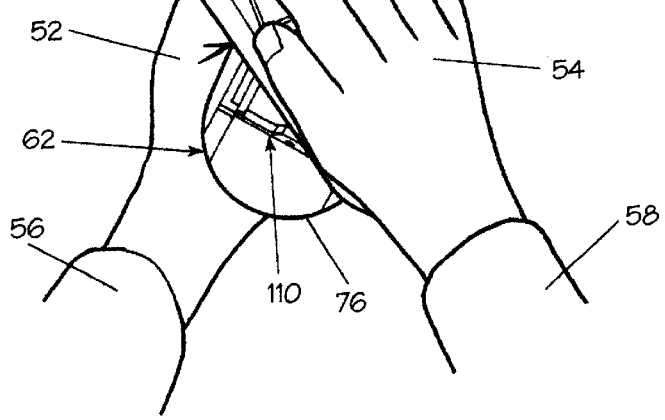

With reference to FIGS. 1 through 7, a first embodiment of a two-handed, hand-held input control apparatus constructed in accordance with the principles of the present invention is generally identified by the numeral 50. The apparatus is shown in FIGS. 1–3 being held by and between the left and right hands 52 and 54. respectively, of a user with the left and right arms being indicated by the numerals 56 and 58 respectively. Second and third embodiments of the apparatus are shown in FIGS. 45–52 and 6–62, respectively, and are described in sequence after the first embodiment.

In general, the input control apparatus 50 (FIGS. 1–7) includes pivotally interconnected, first and second holders or handles 62 and 64 on which are individually mounted input devices 68 and 70. These input devices are of the type normally used to input data, including controls or other information, into a computing system or other electrical, electronic, optical, or electro-optical equipment. Such equipment may include a work station having at least one monitor and several input devices such as is employed in the field of computer-aided design, 3D modeling and animation. Furthermore, the equipment controlled by such input devices includes but is not limited to televisions, VCRs, stereos, motion-control systems including robotics, and real or virtual reality motion control, and like equipment. None of this equipment is shown in the drawings nor described in detail since it is well known and is not part of the present invention.

The input device 68 (FIGS. 1, 4, and 6–8) is shown as a track ball 68a surrounded by a plurality of macro keys 68b radially related to the track ball, and the input device 70 (FIGS. 2, 3, 5 through 7, and 12) is shown as a numeric key pad of twenty keys 70a. It is to be understood, however, that the subject invention is not limited to these particular input devices; the input control apparatus 50 will accept various input devices including but not limited to the illustrated track ball and key pad, a digitizing or graphics or finger touch-tablet, a keyboard (standard, numeric, or one-handed), a joystick, or multidimensional input devices such as 3D input devices for inputting multidimensional spatial data, and any combination of remote controls for TVs, VCRs, stereos, and/or robotics or other motion-control. It is also to be understood that the input devices are not limited to the input of data such as words, numbers or commands but may be capable of entering such data as controls or signals, that is, data in a more general sense, such as described and illustrated for the third embodiment of the present invention (FIGS. 56–62).

With reference now to FIGS. 4 through 15, the first and second holders 62 and 64 respectively include first and second wedge-shaped housings 76 and 78 of uniform size and shape. It is to be noted that reference is made to "first" and "second" holders and housings for descriptive convenience only, since the holders and the housings are identical. Because of their identity, only the housing 76 (FIGS. 8–11) is described in detail, with corresponding parts of the housing 78 being given the same reference numeral followed by a prime.

Accordingly. the first housing 76 (FIGS. 8–11) includes a planar front wall 100 (which as oriented in FIG. 8 is a top wall); a planar back wall 84 (which as oriented in FIG. 9 is a bottom wall); a side wall 86; opposite open and closed end walls 88 and 90; and a hollow interior 92 surrounded by the front. back, side and end walls. In this first embodiment. the front wall is in acute angular relation both to a plane that is perpendicular to the pivot axis 220 of the holders and to the plane of the back wall. as best seen in FIG. 6. Although the subject invention is not limited to any particular dimensions, it may be useful in understanding how the input control apparatus is held by and between the hands of the user to refer to the approximate dimensions of the preferred embodiment. Accordingly, the housing 76 has a length of about eight inches, a width of about four inches, a height of about one-half inch at end 88, and a height of about two inches at the end 90. In this regard, it should be noted that FIGS. 4 through 15 are shown at less than one-half scale.

With continued reference to FIGS. 8–11, the front wall 100 of the housing 76 includes a mounting surface or area 103 occupying about one-half of the surface area of the front wall and terminating at the end wail 90, and a hand-grasping portion 101 having a front planar or flat hand-resting surface or area 102 occupying the remainder of the area of the front wall and terminating at the end wall 88. The track ball 68a and macro keys 68b are mounted on the mounting surface 103, whereas the hand resting surface is clear. That is, the hand resting surface is of sufficient area to allow the user to place the palm of one of his or her hands thereon (the left hand 52 as shown in FIG. 1, but it could be the right hand 54) so that the corresponding fingers can easily manipulate the track ball and macro keys therearound. Moreover, as shown in the second embodiment (FIGS. 45–52), this resting surface as well as the side walls 86 or other walls or surfaces of the housing may be contoured to conform to a user's hand and cushioned for maximum comfort. The third embodiment in FIGS. 56–62 also has shapes more conducive to comfortable holding.

With reference to FIGS. 12–15. the keypad 70a is mounted on the mounting surface 103' of the housing 78, similarly to the track ball and keys 68a and 68b, so that the palm of the user's hand 54 (or 52) can rest on the hand resting portion 102' and the fingers of such hand can conveniently manipulate the keys 70a of the keypad.

The back wall 84 of the housing 76 (FIGS. 8–11) has a rectangularly-shaped recess 104 which extends longitudinally of the housing, opens through the end wall 88, and terminates at a internal transverse wall 105. Elongated transversely spaced slots 106 are also provided in the back wall at both sides of the recess, and these slots also extend the full length of the recess from the transverse wall and open through the end wall 88.

With reference to FIGS. 11 and 15. a signal generator 108 is contained within each of the housings 76 and 78 in order to generate signals representative of the data being entered in the respective input devices 68 and 70. These signals may be transmitted to the equipment being controlled, not shown, from the signal generators through infrared (IR) or other wireless devices 109 and 109' mounted in the housings. or through cables. not shown. interconnecting the signal generators and the equipment. As shown. each wireless device preferably includes a one hundred-eighty degree receptor/sender panel in the closed end wall 90, 90' of each housing. No detail is shown nor described regarding the signal generators. IR or other wireless device types, or cables, since these components, their interconnections and operation for converting movement of the input devices into electronic signals and for transmitting the same to the equipment being controlled are well known.

All three embodiments of the subject hand-held input control apparatus 50, 350 and 550 include a connecting or pivoting mechanism 110 which interconnects the housings 76 and 78 and thus the holders 62 and 64 (FIGS. 16–22). This connecting mechanism. in general, includes a male coupling unit 112 (FIGS. 22–26) and a female coupling unit 114 (FIGS. 22 and 27–31). Each of these coupling units is now described.

Figure 26:
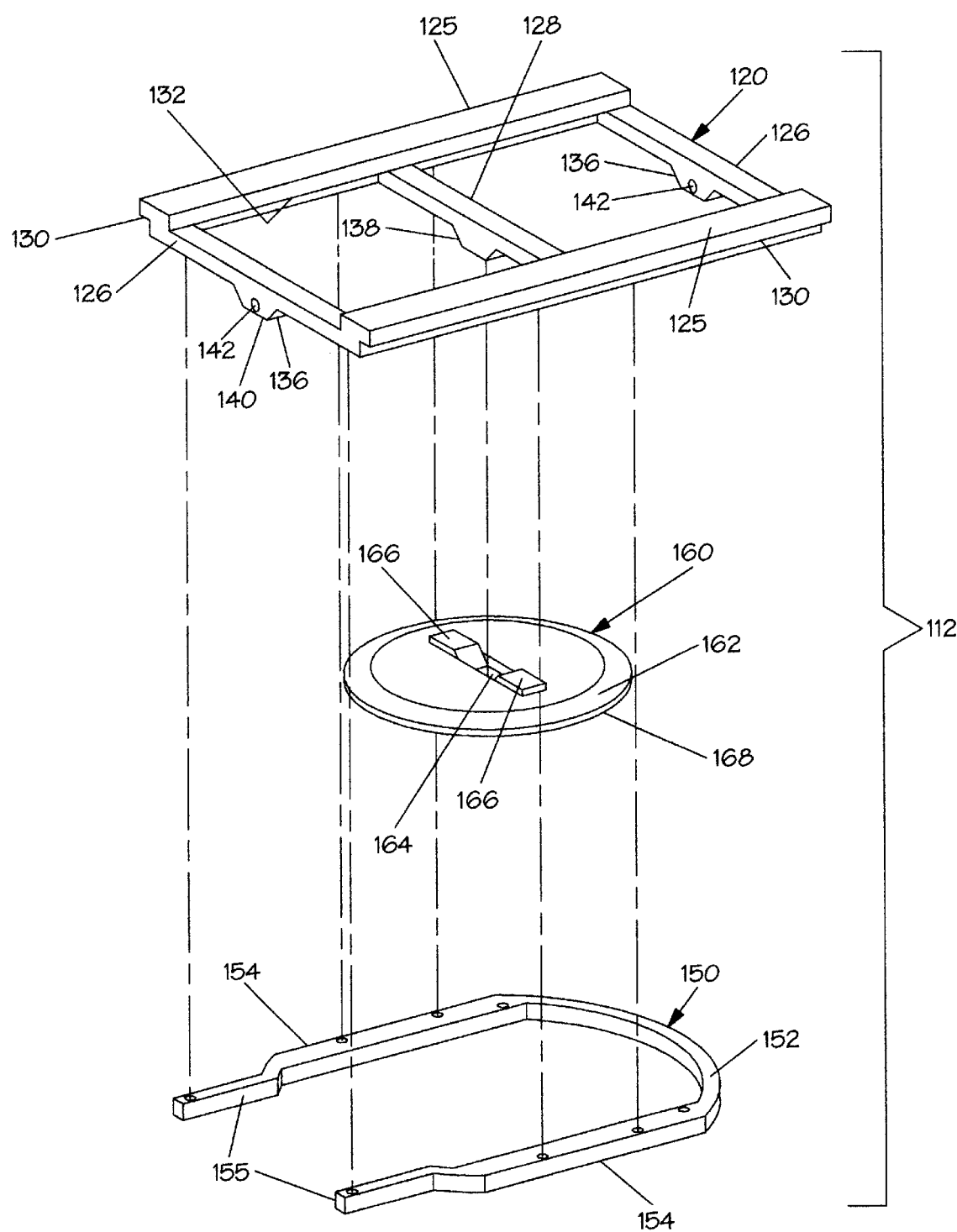
FIG. 26 is an exploded trimetric view of the male coupling unit shown in FIG. 23.

With reference to FIGS. 22 through 31, the male and female coupling units 112 and 114 include duplicate and symmetrical. rectangular male and female connector frames 120 and 120'. FIGS. 32 through 34 show the female connector frame by itself. The male connector frame in FIG. 26 is structurally identical to the female connector frame in FIGS. 31 and 32, but the FIG. 31 frame is inverted from the FIG. 26 frame in their assembled condition. Each frame (FIG. 32) has a pair of spaced parallel longitudinally extending side bars 125, 125' interconnected by a pair of end bars 126, 126' and a center bar 128'. The side bars have outside longitudinally extending L-shaped rails 130, 130' and inside longitudinally extending L-shaped tracks 132, 132'. Furthermore, frusto-pyramidal end lugs 136, 136' project centrally from the end bars, and a frusto-pyramidal central locking lug 138, 138' projects from the center bar in alignment with and between the end lugs. It is to be noted that the lugs have plateaus 140, 140' which are in a common plane parallel to the plane of their frame. Both of the end lugs have threaded holes 142, 142' therein coaxial with the central longitudinal axis of the frame for a purpose to be described.

Figure 30:
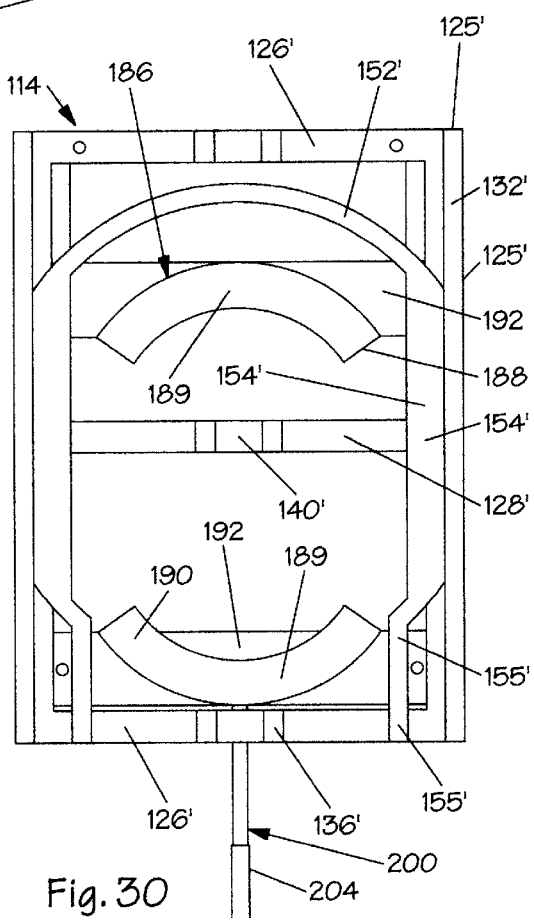
FIG. 30 is a plan view of the female coupling unit as shown in FIG. 28.
Figure 31:
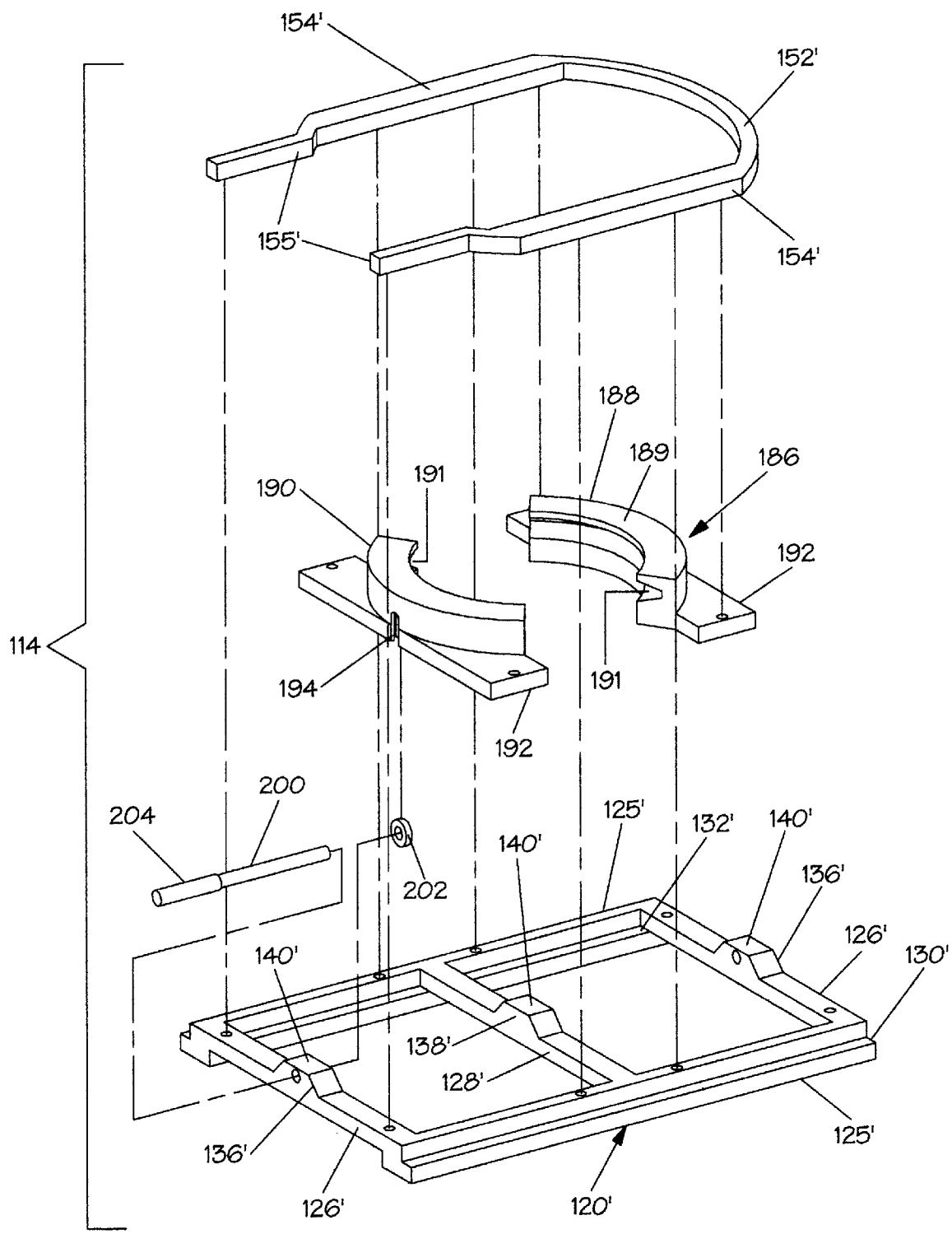
FIG. 31 is an exploded trimetric view of the female coupling unit shown in FIG. 27.

The male and female coupling units 112 and 114 each also includes a wicket- or U-shaped supporting frame or guide 150, 150' (FIGS. 21 through 31, 35 and 36). Each guide (FIG. 35) includes an arch 152, 152' which is a segment of a circle and has opposite ends spaced apart by a distance equal to the distance between the inside edges of the rails 130, 130' of the connector frames 120, 120', that is, slightly less than the width of the connector frames. Each guide also has a pair of transversely spaced side members 154, 154' which extend longitudinally from the ends of the arch, and legs 155, 155' that extend longitudinally from the side members in offset parallel relation thereto. Matching holes are provided in each associated connector frame and the guide so that when the latter are overlaid, the holes align, as indicated by the broken vertical assembly lines in FIG. 26. Thus, each associated frame and guide is assembled by suitable fasteners, not shown, extending into the holes or without fasteners using a snap-fit or plastic welding process. The male supporting guide is fastened under the male connector frame (FIG. 26), and the female supporting guide is fastened on top of the female connector frame (FIG. 31).

Figure 22:
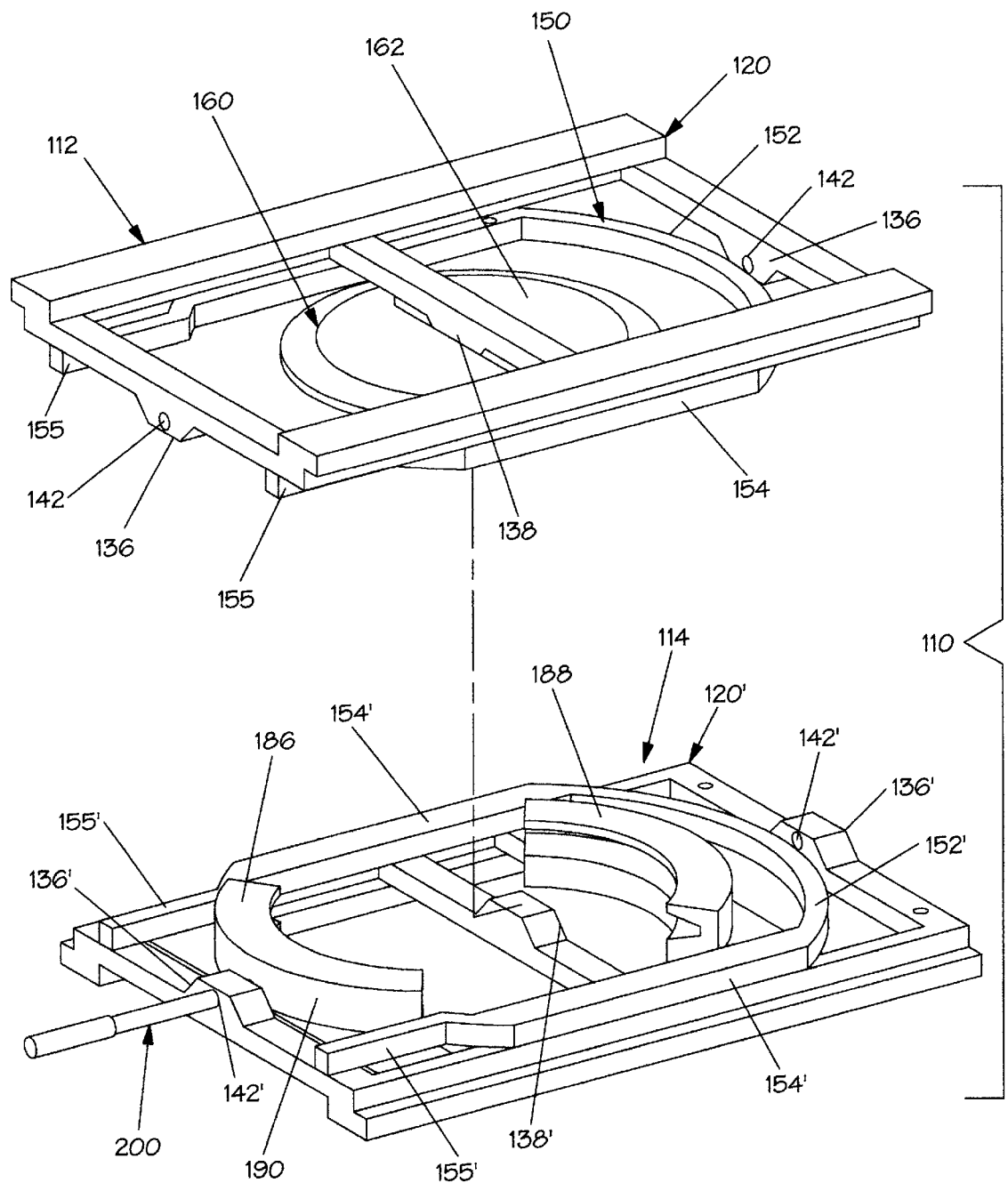
FIG. 22 is an enlarged exploded trimetric view of the coupling units of the connecting mechanism shown in FIGS. 19 through 21.
Figure 23:
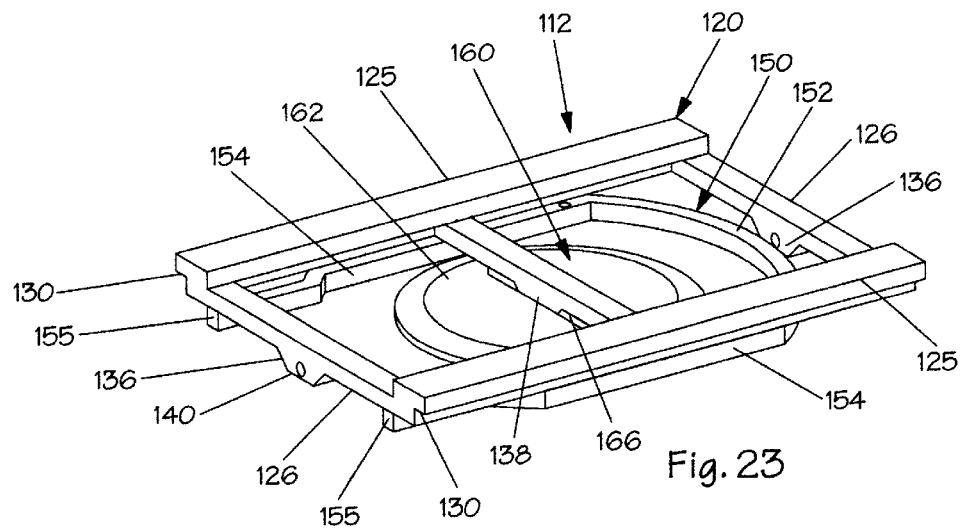
FIG. 23 is a trimetric view of the male coupling unit of the connecting mechanism.
Figures 24, 25:
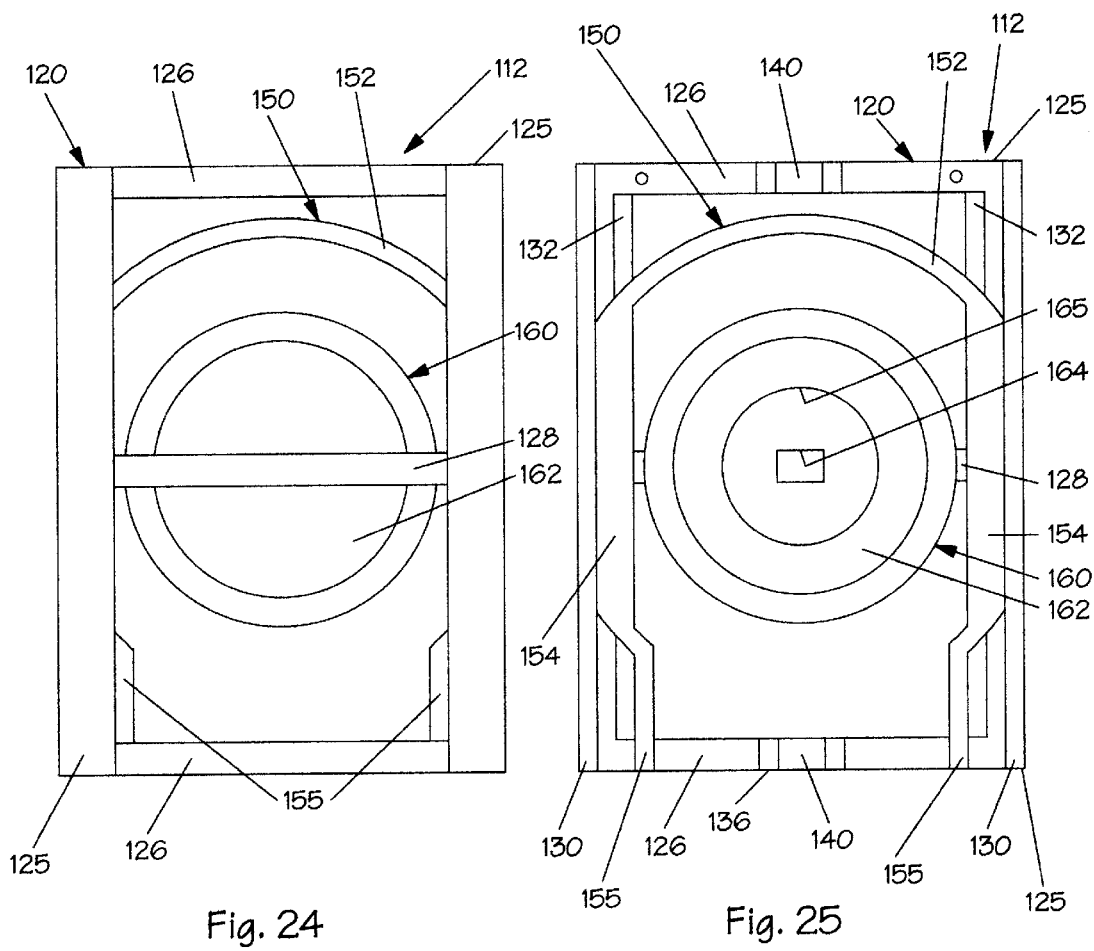
FIG. 24 is an enlarged top plan view of the coupling unit shown in FIG. 23.
FIG. 25 is a bottom plan view of the coupling unit shown in FIG. 23.

As shown in the subassemblies of FIGS. 22 through 26. and 27 through 30, the arches 152, 152' of the male and female supporting guides 150, 150' transversely span their respective male and female connector frames 120, 120' respectively between the side bars 125, 125' and are longitudinally spaced between one of their respective end bars 126, 126' and center bars 128, 128'. Also, the side members 154, 154' extend parallel to and engage the side bars 125, 125' inwardly of their respective rails 130, 130'. The legs 155, 155' terminate at their adjacent end bar 126' but are spaced transversely of the frames a predetermined distance narrower than the spacing of the side bars (FIGS. 25 and 30).

The male coupling unit 112 further provides a male coupling member 160 (FIGS. 22–26 and 37–39) which includes a circular disc 162 having a central rectangular aperture 164 concentrically circumscribed by a circular countersunk annulus 165. The male coupling member also has a pair of diametrically aligned shoulders 166 that project from the disc. The disc also has a circumferential edge 168 that provides an outside diameter less than the diameter of the circle along which the arch 152 lies and less than the distance between the side members 154 of the male supporting guide 150. The disc 162 is assembled with the male connector frame 120 by inserting the central locking lug 138 into the aperture 164 of the disc, as indicated by the broken assembly line in FIG. 26, whereupon the shoulders 166 engage the center bar 128 and the locking lug on opposite sides thereof (FIG. 23). The disc is fastened to the male connector frame either by fasteners that extend through the center bar into the shoulders or by a snap-fit or plastic welding process. The male coupling member 160 is thus integrally connected to the male connector frame within the outline of the male supporting guide 150 but under the frame, as best seen in FIGS. 23 through 25.

The female coupling unit 114 (FIGS. 22 and 27–31) is different, however, from the male coupling unit 112 in providing a female coupling member 186 that includes a stationary coupling shoe 188 and a moveable coupling shoe 190, each of which includes a jaw 189 with an arcuate V-shaped groove 191 therein (FIGS. 27, 28, 31, and 40 through 44). As best seen in FIGS. 29, 30, 41 and 44, each of these shoes is less than one-half of a circular segment but greater than one-quarter of a circular segment. Each shoe also includes a mounting plate 192 that extends generally endwardly of its respective jaw.

The coupling shoes 188 and 190 are assembled with the female connector frame 120' (FIG. 31) by positioning the mounting plates 192 on the tracks 132' of the female frame 120' under the female supporting guide 150' respectively between the end and center bars 126' and 128'. More specifically, the mounting plate of the stationary shoe 188 is sandwiched between the tracks of the female frame and the side members 154' of the female guide so that the stationary shoe is concentric with and radially spaced inwardly of the arch 152' and longitudinally spaced from the center bar 128'. The stationary shoe is fixed in this position either by fasteners that extend through matching holes in the mounting plate and holes in the guide (see FIG. 31) or by a snap-fit or plastic welding process.

Figure 27:
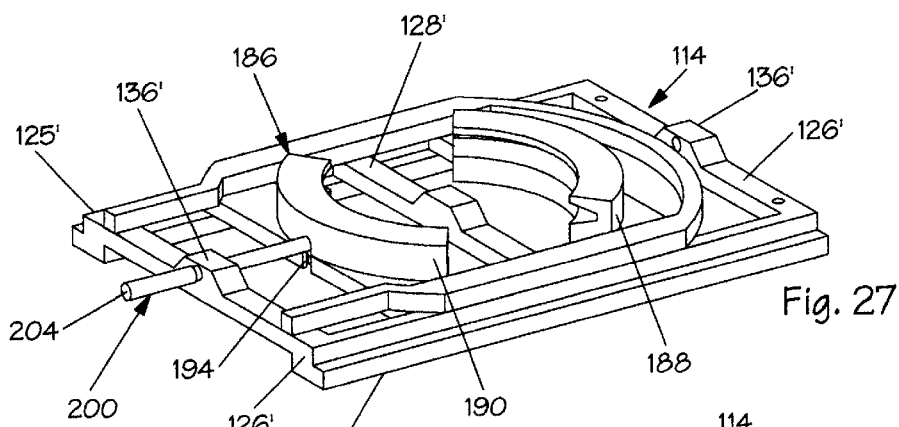
FIG. 27 is a trimetric view of the female coupling unit of the subject connecting mechanism with the female coupling unit in closed position.
Figure 28:
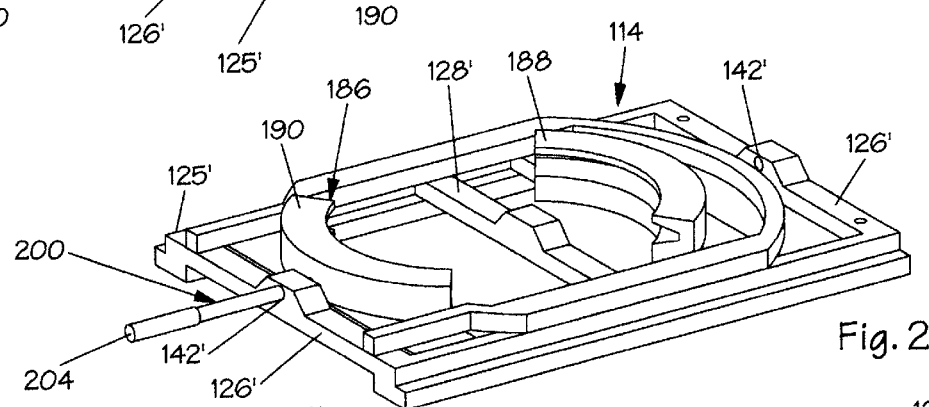
FIG. 28 is a view similar to FIG. 27 with the female coupling unit in uncoupled position.
Figure 29:
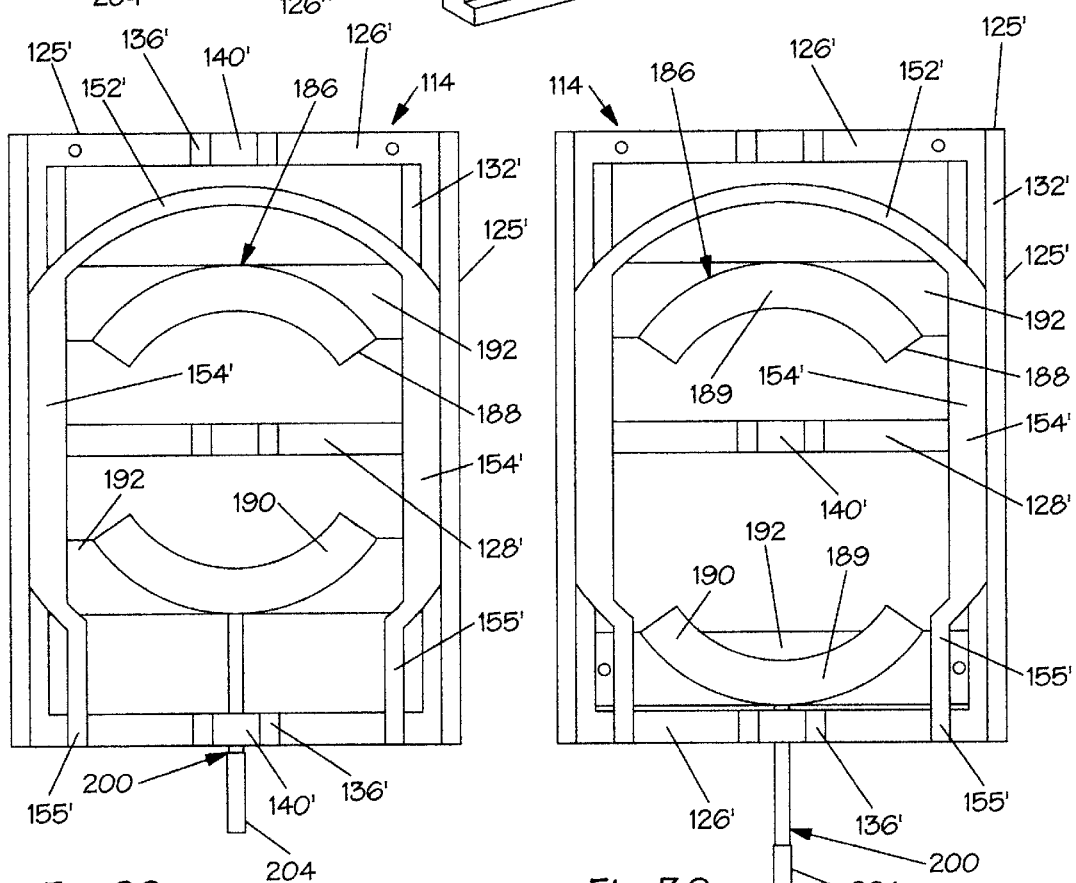
FIG. 29 is an enlarged plan view of the female coupling unit shown in FIG. 27.

The mounting plate 192 of the moveable shoe 190 (FIGS. 27–31) is also sandwiched between the tracks 132' of the female frame 120' and the side members 154', and legs 155' of the female guide 150' but on the other side of the center bar 128' from the stationary shoe 188. The mounting plate of for the moveable shoe, however, is slidably supported by the tracks 132' between the tracks and the side members and legs of the guide. The moveable shoe is thus mounted between the female connector frame and the female supporting guide for slidable movement lengthwise of the frame. The moveable shoe is slidable between a coupled position, as shown in FIGS. 27 and 29, wherein it is concentric with the stationary shoe. and an uncoupled position, as shown in FIGS. 28 and 30, wherein the movable shoe is spaced lengthwise of the frame away from and out of such concentric relation with the stationary shoe. In the coupled position, both shoes are concentric with the center of the female frame at the central lug 138' and have an inside diameter at the groove 191 approximately equal to the outside diameter of the male coupling disc 162, In the uncoupled position, the opening defined by the shoes is greater than the diameter of the disc.

An adjusting rod 200 (FIGS. 22 and 27 through 31) is threadably received in the threaded hole 142' of the end lug 136' of the end bar 126' and has an inner end adjacent to the moveable shoe 190. A retainer ring 202 is secured to the inner end of the rod and is rotatably received in a notch 194 of the jaw 189 of moveable shoe 190 and its mounting plate 192 (FIG. 31). The rod has a handle 204 located outside of the female coupling frame 120' so that by rotating the rod the moveable shoe is moved between its coupled position, as shown in FIGS. 27 and 29, and its uncoupled position (FIGS. 28 and 30), as described above.

In the assembled condition of the coupling units 112 and 114 (FIGS. 16–20), the male coupling disc 162 is rotatably received in the grooves 191 of the coupling shoes 188 and 190. In order to make the assembly (FIGS. 21 and 22), the adjusting rod 200 is backed out to separate the coupling shoes and allow the disc to be positioned in the plane of the grooves of the shoes with the supporting guides 150 and 150' in face-to-face engagement and with the connector frame 120, 120' in opposed spaced relation with their end and central lugs 136, 136' and 138, 138' in contrast.

More specifically. as best visualized in FIG. 22, the male and female coupling units 112 and 114 are initially moved toward each other in face-to-face congruent relation. When the supporting guides 150, 150' are very close to each other but not yet in contact as in FIG. 22, the coupling units are longitudinally adjusted relative to each other so that the central lug 138 is offset from the central lug 138', as indicated by the broken vertical assembly lines in FIG. 22. The units are then moved closer, the arch 152 of the male supporting guide 150 clearing the outside of the stationary shoe 188, until the disc 162 engages the plateau 140' on the central lug 138', it being noted that the annulus 165 in the disc is provided to facilitate centering of the disc on the central lug. At this time, the edge 168 of the disc is in the plane of the grooves 191 of the shoes 188 and 190 and partially circumscribed thereby, and the side members 154 and 154' of the male and female supporting guides are aligned and in engagement. The male coupling unit is then moved longitudinally relative to the female coupling unit toward the stationary shoe 188, as illustrated by the horizontal assembly line in FIG. 22, to fit the edge 168 of the coupling disc 162 into the groove 191 of the stationary shoe. This movement of the male coupling unit also slides the male guide 150 over the female guide 150' so that in the coupled position of the disc and shoes, the guides and the connector frames 120 and 120' are in congruent face-to-face relation with the guides in full slidable engagement; at this time, the plateaus 140, 140' on the end and central lugs 136, 136' and 138, 138' of the connector frames are also respectively in full slidable engagement assuming that the connector frames are congruent.

The adjusting rod 200 (FIG. 27 to FIG. 31) is then threaded inwardly to slide the moveable shoe 190 into its coupled position so that the disc 162 is captured in the grooves 191 of both shoes 188 and 190 for rotatable movement relative to the shoes. Assembled in this manner, the male and female coupling units 112 and 114 can be pivoted relative to each other about the axis 220 (FIGS. 6, 7, and 19) of the disc and the coupling shoes. The pivotal interconnection of the two units is such that the units are free to rotate a full three hundred-sixty degrees relative to each other, and the units are fully supported throughout the complete three hundred sixty degrees of movement by the continuous slidable engagement of the supporting guides and intermittently supported by the slidable engagement of the lug plateaus 140, 140'. The resistance to pivotal movement of the coupling unit, or drag, is adjusted by the rod; threading the rod in increases the drag and threading the rod out reduces the drag. A finely threaded rod allows fine adjustment of this drag.

As an alternate to the threaded adjusting rod 200, a spring-loaded rod, not shown, could be used with the drag built-in and predetermined by the load of the spring. Another alternate embodiment, not shown, for moving the moveable shoe 190 of the female coupling unit 114 is to provide an electronic actuator device to control movement of the shoe 190.

Following their assembly as described, the coupling units 112 and 114 remain in their coupled condition during their normal use wherein they are prevented from separating and are allowed only the described rotational movement relative to each other. It is of course possible to disassemble the coupling units if desired for maintenance or for some other reason by merely reversing the steps set forth above.

With reference to FIG. 16, the first and second housings 76 and 78 are joined by the connecting mechanism 110 as follows: the rails 130 of the male coupling unit 112, for example, are aligned with the slots 106 in the back wall 84 of the first housing 76, and the rails are then slidably inserted into these slots and moved fully within the housing until the inner end of the male connector frame 120 engages the transverse wall 105 (FIG. 5). At this time, the male coupling unit is fully within the recess 104 of the first housing and is thus disposed in back of or underneath the first housing. Then, as will be understood, the other housing 78 is connected to the female coupling unit 114 in a similar manner by sliding the rails 130' into the slots of the housing 78. The two holders 62 and 64 are thus interconnected, as shown in FIGS. 4–7, in back-to-back relation and for three hundred-sixty degree pivotal or rotational movement relative to each other. It will be understood that the length of the connecting mechanism 110 is less than the length of the housing so that the connecting mechanism is completely concealed in back of or underneath each housing when the housings are in their congruent position, as in FIG. 2, and partially concealed in other positions, as in FIGS. 1, 3, 4 and 5. It is also to be noted that rotation of the holders relative to each other is about the axis 220 (FIGS. 6, 7, 11, 15, and 19) of the disc 162 which is perpendicular to the back walls 84 of the housings and extends transversely of each housing.

FIG. 16 indicates spring-loaded ball plungers at 250 in each housing 76 and 78 whose balls slightly protrude into the slots 106, 106'. Detents 252 are located in the side bars 125, 125' of each connector frame 120, 120' so that the balls and detents are in alignment when each of the coupling units 112, 114 is slid into its housing. The balls yield because of the springs to allow full seating of the connector frame at which time the balls are spring-pressed into the detents.

These detent mechanisms, well-known in the art, are thus employed releasably to retain the housings on their respective coupling units 112 and 114, but other releasable holding mechanisms well known in the art could be employed.

It is significant that the seven molded parts of the connecting mechanism 110 (FIGS. 26 and 31) include three pairs of symmetrical duplicates, namely, the frames 120, 120'; the guides 150, 150'; and the shoes 188, 190. Fewer parts, of course make it more cost-effective to mold the parts and make the connecting mechanism more adaptable to automated assembly.

OPERATION OF THE FIRST EMBODIMENT AND DESCRIPTION OF METHOD

The operation of the first embodiment of the subject two-handed, hand-held input control apparatus 50 is described with reference to its use for inputting data into a computer-aided design (CAD, 3D modeling and animation) system, not shown but well understood. In such a system, there are typically at least one monitor or display and several input devices normally all located on a desktop. The input control apparatus allows the necessary input devices, as 68 and 70, to be placed on the holders 62 and 64 and thus removed from the desk top. Although only two input devices are referred to as being mounted on the connecting mechanism 110 at any one time, in fact the trackball 68a and macro keys 68b represent two input devices while the keyboard is a third device, so that it is to be understood that the invention is not limited to mounting only two input devices at a time. Moreover, either one or both of the devices 68 or 70 can be removed from the connecting mechanism and replaced by another input device or devices.

In use, therefore, the operator of the CAD, 3D modeling and animation system, for example, can move back away from the desktop in either a sitting or standing position, or as explained above in a reclining position. The input apparatus 50 is held in and between the hands. 52 and 54, of the user (FIGS. 1–3) with the hands in a palm-to-palm facing relation simulating a clapping position. Depending on the orientation of the apparatus, either or both of the holders 62, 64 are grasped by the user's respective hands, as in FIG. 2, or only one holder need be grasped by one hand with the other hand merely resting on its holder, as in FIGS. 1 and 3. When grasped or supported, the holder 62 or 64 is most comfortably held in either hand between the thumb and the little finger with the middle fingers over the respective input device. Although either hand can engage either holder, FIG. 1 shows the palm of the left hand against the hand-resting surface 102 of the holder 62 with the left fingers in a convenient position for manipulating the track ball 68a and the keys 68b. FIG. 3 shows the palm of the right hand 54 against the resting surface 102' of the holder 64 so that the right fingers are disposed over the keys of the keypad 70a in a convenient position for manipulating the keys.

In use, therefore, it is assumed that the apparatus 50 is held or grasped as described in the preceding paragraph and as shown in FIG. 2. When it is desired to input data from the trackball 68a and macro keys 68b, the hands 52 and 54 are preferably rotated in a clockwise direction (as seen by the user looking out at his or her hands) about the axes 230 and 240 of the user's arms 56 and 58 so that the housing 76 is on top and the housing 78 is on the bottom, as illustrated in FIG. 1. In this position, the entire apparatus is supported by the lowermost or right hand 54 with the right hand-grasping the lower holder 64, thereby leaving the left hand 52 free simply to rest on the hand resting surface 102 and the left fingers free to manipulate the trackball and keys. Thus it is seen that, as contrasted with single-handed, hand-held input devices, the input control apparatus can be supported in one hand so as to relieve the other hand of any supporting responsibilities and leave it free to manipulate the adjacent input device.

If after inputting data via the input device 68, it is desired to input data from the other input device 70, the hands 52 and 54 are rotated in a counterclockwise direction from the position in FIG. 1 through the position of FIG. 2 into the position of FIG. 3 thereby to reverse the positions of the input devices 68 and 70. That is, now the input device 68 is on the bottom and the input device 70 is on the top; the left hand is grasping holder 62 and is supporting the apparatus 50, and the right hand is free to rest (in the supporting surface 102 of the holder 64, and the right fingers are free to manipulate the keypad 70a. As will be evident, the holders and their devices can be rapidly and alternately rotated back and forth as necessary to input data or otherwise manipulate the controls in the manner described.

During this change of position, the hands 52 and 54 rotate around the longitudinal axes 230 and 240 of their respective arms 56 and 58 through an angle of approximately one hundred and eighty degrees, and the holders 62 and 64 and their input devices 68 and 70 rotate on the connecting mechanism 110 through an angle of from about one hundred twenty degrees to about one hundred fifty degrees. In either of the described operating positions of FIGS. 1 and 3, however, the holders are at an angle of from about sixty to seventy-five degrees to each other. These angles of rotation are given as representing the most likely angles, but the invention is not limited to such angles inasmuch as the particular angles that may be used will be a matter of personal preference and comfort for the particular user, it being understood that the connector mechanism provides for three-hundred sixty degrees of movement.

Although the above described operation involves pivoting the holders 62 and 64 (FIGS. 1–3) relative to each other in order to position the selected input device 68 or 70 on top in a convenient manipulating position, it is not necessary that the apparatus be used in this manner. Ambidextrous individuals may find it preferable to operate the input devices with either hand 52, 56, or simultaneously with both hands. Thus the apparatus may be held and operated in various orientations and irrespective of the relative top or bottom position of the selected input device. If not held as in FIGS. 1 and 3, the most likely alternative is the congruent frontal position of FIG. 2 where the devices are held similar to an accordion or cymbals. Moreover, this apparatus allows such ambidextrous people to operate the input devices simultaneously in the position of FIG. 2, if this is deemed necessary.

Single and dual adjustable ("Velcro" type hook and loop) hand straps, not shown, may be incorporated to facilitate holding or carrying the apparatus 50. In one embodiment, a single hand strap would make it safer to hold the apparatus while standing or moving around. A releasable snap-type fastener could be used to releasably secure the strap to either housing 76 or 78. In another embodiment, dual hand straps individually attached by snap fasteners to the housings 76 and 78 would make it easier to manipulate both input devices 68 and 70 simultaneously as is described above in the preceding paragraph.

One of the most significant advantages in using the first embodiment of the input control apparatus 50 is that it allows the user to look continuously at the display on the computer monitor, not shown, and to input data without having to move his or her hand from one input device to another input device. Since the hands remain on the holders 62, 64 and in manipulating positions relative to the input devices 68, 70, the operator can continue to look at the display while inputs are being made so that there is no loss of concentration. there is less chance of error, and the task is less tiring. Furthermore, with the input control apparatus the user is not fixed to a desk but can move away from the display, assume more comfortable sitting positions, and even stand and walk about in the vicinity of the display.

As noted above, the connecting mechanism 110 allows one or both of the holders 62 or associated connector frame 120 or 120'. Either holder can be removed in order to change an input device mounted on another similar holder that would then replace the holder and input device removed. Furthermore, under some circumstances it may be desirable to place an input device on the desktop in which event the holder can be removed from the connector and positioned on the desk in the conventional manner. Once again, as contrasted with the single hand, hand-held input devices, this apparatus allows for the holding of multiple input devices.

SECOND EMBODIMENT

With reference to FIGS. 45–49, an input apparatus in accordance with the second embodiment of the present invention is generally indicated by the numeral 350. There is considerable similarity between the first and second embodiment so that only the different features will be described in detail in the following description. As before, the second embodiment includes first and second holders or handles 362 and 364 with input devices and 368 and 370 being mounted on these holders. As illustrated, the input device 368 is a trackball and keys, whereas the input device 370 is a keyboard. As before, invention is not limited to these particular input devices nor to their particular configurations.

With reference to FIGS. 45–52, the first and second holders 362 and 364 respectively include symmetrical, first and second paddle-shaped housings 376 and 378 of uniform size and shape so that they are therefore completely interchangeable. Since the housings are identical, only the housing 376 will be described in detail, at least for the most part, with the common elements of the other housing being given the same reference numeral. However, in the interest of drawing clarity, not all reference numbers are repeated on housing 378.

Thus, the housing 376 (FIGS. 45–52) has a front wall 400, a back wall 386, opposite end walls 388 and 390 (FIGS. 49 and 48, respectively), and a hollow interior 392 (FIG. 47). The housing also includes a generally semi-ellipsoidal, hand-grasping portion 401 that has a flat back surface 386a and a rounded, hand resting front surface 402 having a generally semi-elliptical contour (see FIGS. 45 and 48). In addition, the front wall of the housing has a planar, device mounting surface 403 that extends longitudinally endwardly from the hand resting surface.

With particular reference to FIGS. 47 and 48, it will be noted that a plane that is tangent to the hand resting surface 402 is parallel to the plane of the device mounting surface 403 and also to the pivoting planes of the holders 362 and 364, that is the planes that are perpendicular to the first axis 220, the axis of rotation of the holders 362 and 365. Moreover, all three of these planes are parallel to the back surface 386a of the back wall 386 of the housing 362. The described parallel relationship between these planes in this second embodiment differs from the first embodiment. As previously noted, the planar front wall 100 of the first embodiment is in acute angular relation to the pivoting plane in the first embodiment. In this second embodiment, however, the plane that is tangent to the hand resting surface of the device mounting surface 403 is parallel to the pivoting plane The advantage of this parallel relationship is that it is believed to provide for more comfortable hand, wrist and arm positions and to avoid repetitive strain injuries.

The input device 368, or 370 in the case of the housing 378, is mounted on the device mounting surface 403 and occupies substantially all of such surface. The input devices 368 and 370 are thus mounted so as to be conveniently accessible especially to the middle fingers of a user whose hand is grasping the hand-grasping portion 401. The rounded hand resting surface 402 is shaped to accommodate the palm of the user's hand with the hand-grasping portion being most conveniently held between the little finger and the thumb of the user's hand. This grasp thus frees the three middle fingers for extension over either the trackball 368 or the keyboard 370 so that these input devices can be actuated by the user's middle fingers while holding the hand-grasping portion 401.

The back wall 386 of the housing 376 (FIG. 52) provides a generally rectangularly-shaped central recess 404 defined by an arcuate, transverse end wall 405, longitudinally extending side walls 407, and a central plateau 410 and opening adjacent to the end wall 390 of the housing. Furthermore, the back wall 386 has a pair of lateral slots 406 extending alongside the side walls 407 at opposite sides of the plateau. These slots have closed ends 406a respectively adjacent to the end wall 405 and to the opening of the recess.

With reference to FIG. 47, signal generators generally indicated by the number 408 are contained within the housings 376 and 378 in order to generate signals representative of the data being entered via the respective input devices 368 and 370 and in response to actuation of these input devices. These signals are transmitted to equipment being controlled, not shown, from the signal generators through infrared (IR) or other wireless devices generally indicated by the numeral 409 mounted in the housings 376 and 378, or through cables, not shown, interconnecting the signal generators and the equipment being controlled. As illustrated, each wireless device preferably includes a one-hundred eighty degree receptor/sender panel in the closed end wall to 388 (FIG. 47) of each housing No detail is shown or described regarding these signal generators, wireless devices, or cables since these components, their interconnections, and their operation for converting movement of the input devices into electronic signals and for transmitting the same to equipment being controlled are well known.

As previously mentioned, the second embodiment 350 of the subject input control apparatus uses the identical connecting or pivoting mechanism or connector 110 previously described and illustrated in FIGS. 17–48. As previously described, the connector includes male and female coupling units 112 and 114, respectively, and these provide a pivot access 220, which will be referred to herein as the first pivot axis. For additional detail regarding the connector, reference is made to the description provided for the first embodiment. It is believed well understood that the connector interconnects the holders 362 and 364 for rotation or pivotal movement about the first pivot access 220.

However, for this second embodiment of the input control apertures 350, as well as the third embodiment 550 to be described, the connector 110 includes a coupling adapter or frame receptacle 420 (FIGS. 51–55) in order to facilitate use of the connector 110 with either the second or third embodiments. In this sense, therefore, the term "connector" may include the coupling adapter when referring to the second and third embodiments of the invention or may exclude it when referring to the first embodiment. In other words, the coupling adapter interconnects each coupling unit 112 and 114 with its respective holder 362 and 364 and thus is part of the mechanism interconnecting the holders in the second embodiment of the invention, as well as the third embodiment to be described.

Each coupling adapter 420 (FIGS. 51–55) may also be referred to as a frame receptacle for reasons that will be understood and has a front 422, a back 424, arcuate opposite ends 426 and 428, and straight sides. The front (FIG. 53) includes elongated longitudinally extending, transversely spaced, lateral tongues 430 and a central wall 432 extending between the tongues. The back of the adapter (FIG. 52) provides a pair of transversely spaced longitudinally guide rails 434, an intermediate central plateau 436, and elongated longitudinally extending slots 438 defined between the guide rails and the plateau. The slots are closed at the end 428 of the adapter but open adjacent to the end 426. The back 424 of the adapter 420 thus has a construction similar to the back wall 84 of the housing 76 of the first embodiment of the invention, as seen in FIGS. 9 and 13. As will be seen, therefore, like the back wall 84 of the first embodiment, the back of the adapter is configured to receive either the male or the female coupling unit 112 or 114 and thus in this sense it adapts its holder 362 or 364 to the coupling units. Since it receives the connector frames 120 and 120' of the coupling unit, it is also a frame receptacle.

With reference to FIGS. 51 and 52, the front 422 of the coupling adapter 420 is configured to interfit with the holder 362 or 364. Thus, as best seen in FIG. 52, the adapter 420 is of a width that allows it to fit between the side walls 407 of either housing 376 or 378. When the adapter end 428 is mated against the end wall 405, the tongues 430 drop into the grooves 406 of the housing, as shown in FIG. 51. The coupling adapter is secured to its respective housing with any is suitable fastener, such as an adhesive, welding, or a mechanical fastening element or elements.

Although not shown, it may be desirable to connect the coupling adapter to its housing so that it can be removed, and if so, a suitable removable mechanical fastening device may be employed instead of a more permanent type of attachment such as adhesive or welding. In any event when the housing and its adapter are assembled, as shown in FIG. 51, the backs of the holders 362 and 364 look very similar to the backs of the holders 62 and 64, as illustrated in FIGS. 9 and 13. That is, the slots 438 are provided for slideably receiving the rails 130 of either connecting frame 120 or 120', as illustrated in FIG. 16.

The holders 362 and 364 are thus interconnected by the connector 10 including the coupling adapters 420 for pivotal movement about the first pivot access 220. The operation of this second embodiment and its method of use are thus very similar to that already described with regard to the first embodiment, so no repetition is made here, Apart from the more advantageous ergonomic aspects of the holders 362 and 364 of the second embodiment, as alluded to above, these holders have structural features in common with their counterparts in the third embodiment that will shortly be described.

Although the input control apparatus 50 or 350 has been described with references to its use in inputting data, such as words and numbers, into a computer system, the apparatus is not so limited in use. It has been variously alluded to in the preceding description that "inputting data" also means inputting controls or signals, that is, data in a broader sense. For example, the data being inputted into controlled equipment, not necessarily including a display monitor, may be motion control signals generated by relative movement of the male and female coupling units 112 and 114. The third embodiment of the present invention enables such use for motion control.

THIRD EMBODIMENT

The third embodiment of the subject input control apparatus is generally indicated by the number 550 in FIGS. 56–62. The input control apparatus 550 also includes first and second holders or handles 552 and 554 mounting input devices 568 and 570. These holders and their input devices are interconnected in the same way as the second embodiment of this invention and thus are connected for relative pivotal movement about the first axis 220. However, this third embodiment enables pivotal movement of the holders about another axis herein referred to as the second axis or axes or pivot or pivots, now to be described.

Figure 62:
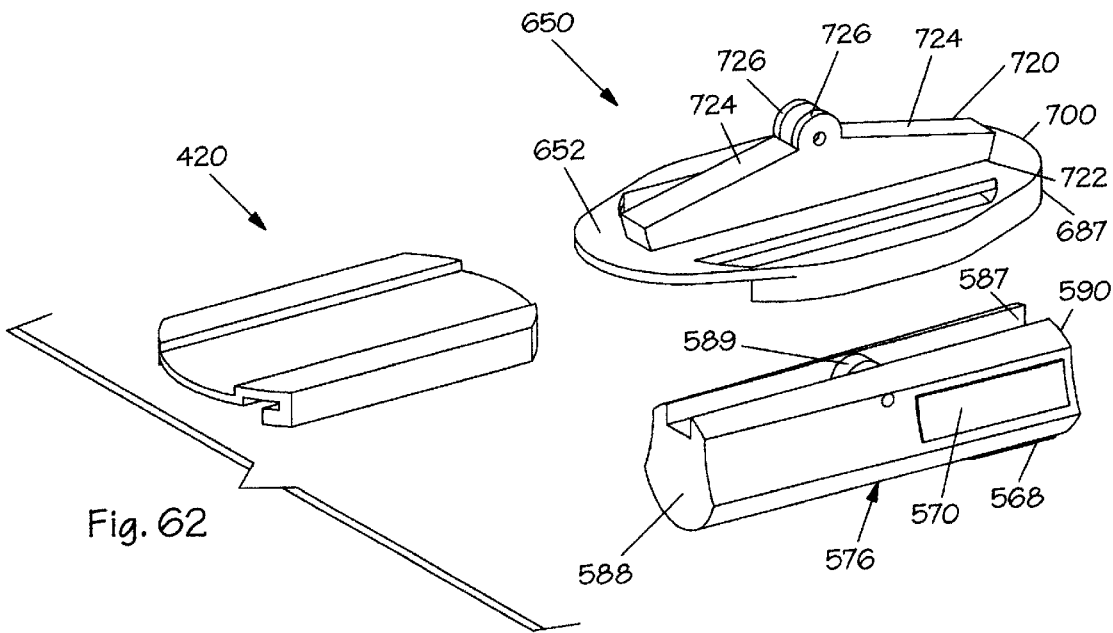
FIG. 62 is an exploded view of the coupling adapter and holder of FIG. 61, but with the housing and base of the holder separated and with both the base and the adapter inverted from their positions of FIG. 61

Each holder 552 and 554 (FIGS. 56–58, 61 and 62) includes a housing 576 and 578, respectively. Since these housings are identical, only housing 576 will be described in detail. Thus, the housing is elongated, roughly cylindrical, and has a rounded, arcurate, semi-cylindrical front wall 600, a back wall 586, flat end walls 588 and 590, and a hollow interior 592. The back wall has an elongated central slot 587 extending from end-to-end of the housing. A circular boss 589 is located centrally within the slot and projects upwardly in spaced relation to the sides of the slot, as shown in FIG. 62

The housing 576 (FIGS. 56–62) includes a front device mounting surface 603, side device mounting surfaces 603a, a hand-grasping portion 601, and a front hand resting surface 602. As contrasted with the first and second embodiments, the input devices 568 and 570 are preferably buttons mounted on the front and side mounting surfaces. In view of the intended use of the third embodiment, such buttons are believed to be the preferred input device, but it is to be understood that other input devices such as described for the first and second embodiments could be incorporated in the holders 552 and 554. As previously indicated, the same pivoting mechanism 110 (FIGS. 56–58) including male and female coupling units 112 and 114 is used to join the holders 552 and 554 of this third embodiment. Moreover, and as also previously indicated, the coupling adapter 420 (FIGS. 61 and 62) is used to connect the coupling units to the holders, as will be described.

Each holder 552 and 554 includes a base or platform 650 (FIGS. 61–62) that is similar to the backs of the housings 376, 378 in the second embodiment. The base includes a generally circular plate 652 providing a front wall 700, a back wall 686, a peripheral edge 687, and opposite ends 688 and 690. The back wall 700 of each base 650 is constructed like the back wall 386 of the second embodiment, as best shown in FIG. 52. Thus, this back wall 686 has a central recess 704, an arcuate transverse end wall 705, side walls 707, a central plateau 710, and lateral grooves 706 that are closed at the ends at 706a.

Each base 650 is provided with a rocker arm 720 (FIG. 62) having a back edge 722 secured to the front wall 700 and extending between the ends 688 and 690, convergent front edges 724, and a pair of spaced mounting ears 726 at the convergence of the front edges. Each rocker arm is assembled to its respective base 650 by placing the mounting ears on opposite sides of the associated boss 589, and by extending a pivot pin 728 through aligned holes in the boss and the mounting ears. Each pivot pin constitutes the second pivot axis for its holder 552 or 554 that has been referred to previously.

The holders 552 and 554 (FIGS. 56–58 and 61) are interconnected by the pivoting mechanism 110 including the coupling adapter 420 in the following manner. A coupling adapter is inserted in the central recess 704 of each holder 552 and 554 whereby the lateral tongues 430 drop into the grooves 706. Again, the adapter is attached to the base 650 in one of the ways previously described with regard to the second embodiment. As such, the adapter is ready to accept one of the coupling units 112 or 114. Thus, the assembly of the holders 552 and 554 is the same as that described with regard to the first embodiment and shown in FIG. 16. With the holders 552 and 554 thus interconnected, they are connected for pivoting movement about the first axis 220 but also for independent pivoting movement about their respective second axes 728.

The third embodiment of the present invention also includes signal generators 750 (FIG. 58) and wireless transmitting devices 748, which operate similarly to their counterparts in the first and second embodiments, and all of which are mounted within the housings 576 and 578 as shown. The third embodiment of the present invention also includes rotary sensors 754 associated with pivots 728 which are also mounted within the housings 576 and 578.

OPERATION AND METHOD OF THE THIRD EMBODIMENT

The primary purpose of the third embodiment of this invention is to be able to control the motion of objects, real or virtual, with the input control apparatus 550. With the apparatus assembled as shown in FIGS. 56–60, the operator grasps the holders 552 and 554 with the hand-grasping portions 601 so that the input devices 568 and 570 are accessible to be actuated by the fingers of the respective hands, especially the middle fingers. The operator is thus able to pivot or rotate the holders relative to each other about the first axis 220 in the same manner as described with regard to the first and second embodiments. In addition, the user is now also able to rotate each holder on its rocker arm 720 about its respective second axis 728. Of course, pivoting or rotation about these two axes may occur simultaneously or independently. As the holders are pivoted about the axis 220, they actuate the rotary sensors 752 in the connector mechanism 110 which cause signals to be transmitted from the transmitting devices 748 indicative of the rotary movement of the holders about this first axis 220.

When each holder 552, 554 (FIGS. 56–60) is pivoted about its respective second axis 728, it activates the rotary sensors 754. The wireless transmitting devices 748 are responsive to outputs from the signal generators 750 and to actuation of the rotary sensors 754 and transmit signals from the input apparatus 550 indicative of the positions of the holders about their respective first and second axes. The dual and symmetrical hand gripped holders 552 and 554 including the transmitting devices 748 are intended to operate in unison with each other in order to average the angles of each of the operator's different hand positions and in conjunction with movement about the pivot axis 220.

Figures 56, 57:
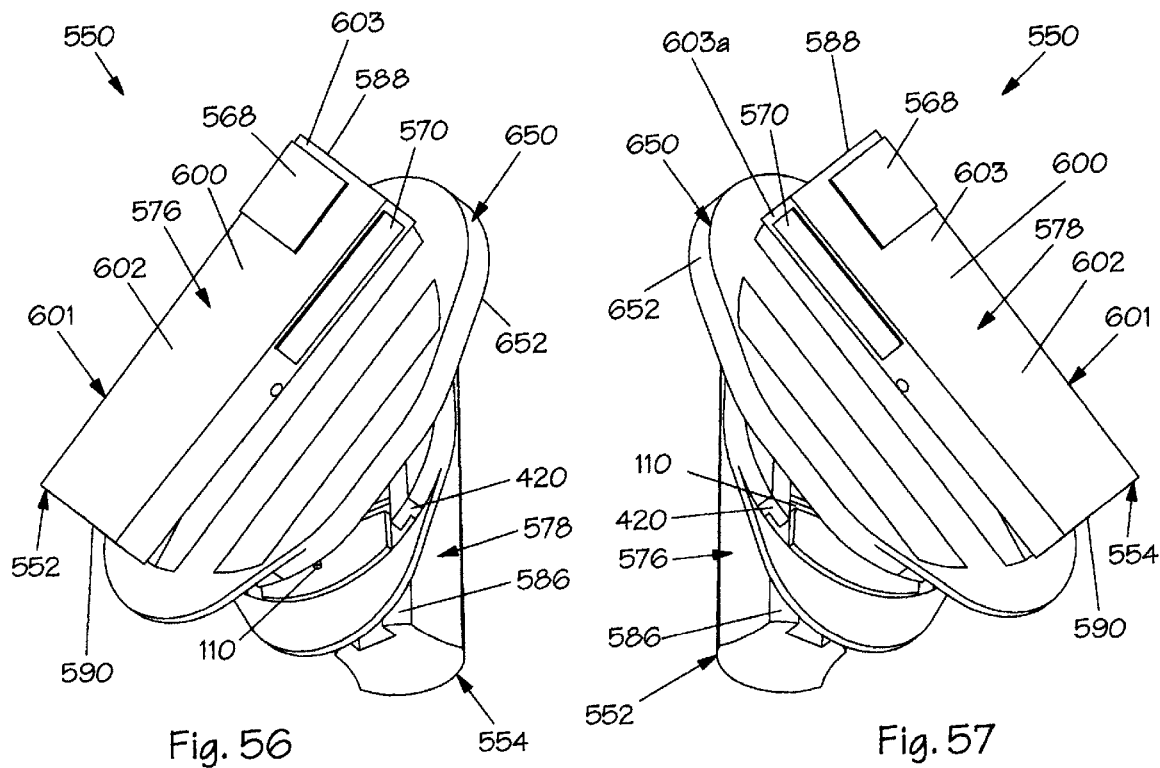
FIG. 56 is a view similar to FIG. 45 but of the third embodiment of the present invention for controlling the motion of real or virtual objects and in this view showing, for example, how the holders may be used to control motion to the right along a level path.
FIG. 57 is a view similar to FIG. 46 but of the third embodiment of the present invention for controlling the motion of real or virtual objects and in this view showing, for example, how the holders may be used to control motion to the left along a level path.

The input control apparatus 550 of the third embodiment is useful both for controlling real or virtual objects, such as manned or unmanned vehicles. This third embodiment allows full motion control for controlling the motion or path of the operator through a virtual world along with the ability of the operator to manipulate objects in that virtual world. For example, to control manned or unmanned air, water or space-based vehicles, pivoting movement of the holders 552 and 554 about the first axis 220 may be used for turning right or left, as respectively illustrated in FIGS. 56 and 57. That is, as a motion controller, the holders in FIG. 56 are shown in positions that would cause a controlled vehicle, not shown, to travel along a level path but to turn to the right. Conversely, the holders in FIG. 57 are shown in positions that would cause a controlled vehicle, not shown, to travel along a level path but to turn to the left.

Figure 58:
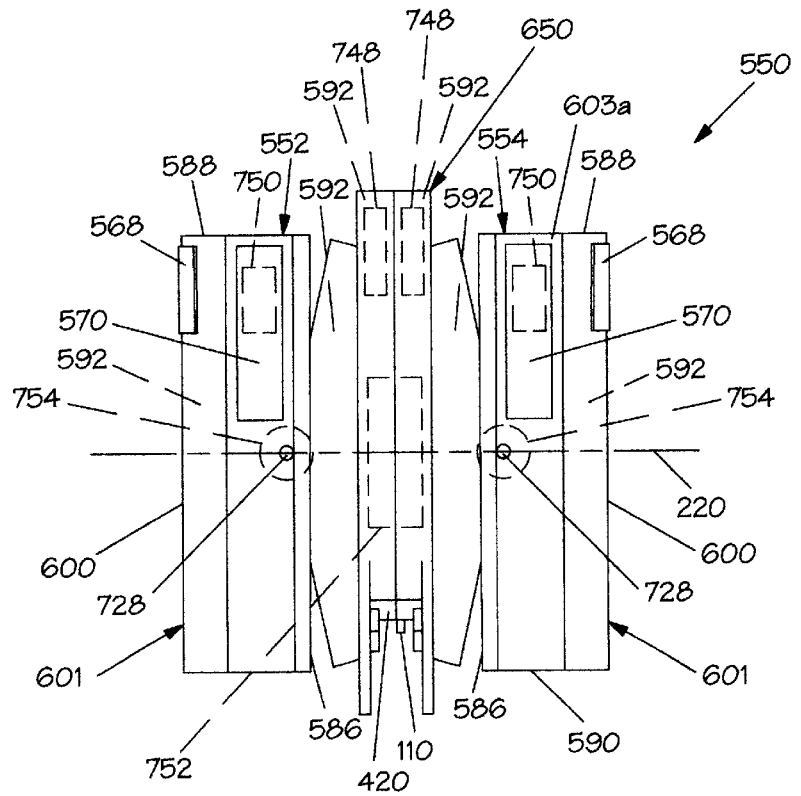
FIG. 58 is a view similar to FIG. 47 but especially showing the second pivots of the third embodiment and showing, for example. how the holders can control motion in a level, straight-ahead path.
Figure 59:
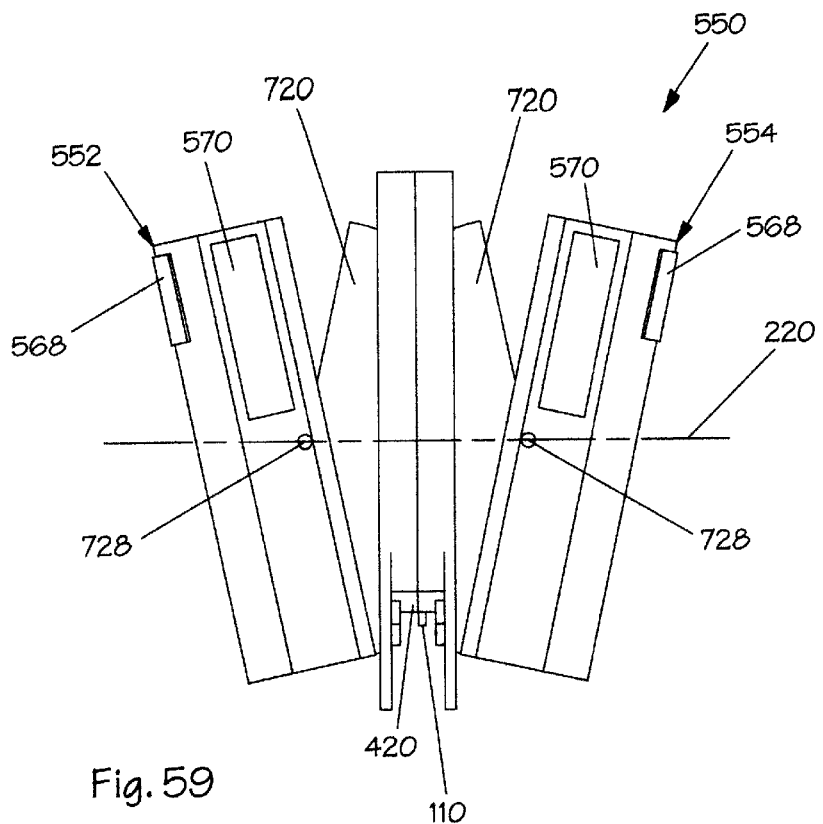
FIG. 59 is a view similar to FIG. 58 but showing how the holders can control motion in a an ascending, straight path.
Figure 60:
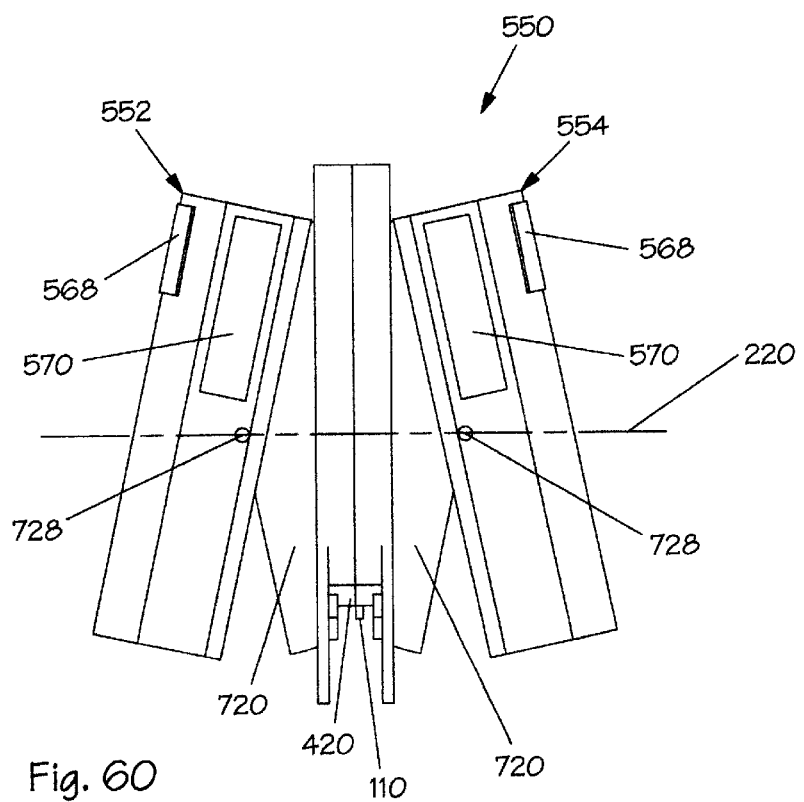
FIG. 60 is a view similar to FIG. 58 but showing how the holders can control motion in a a descending. straight path.
Figure 61:
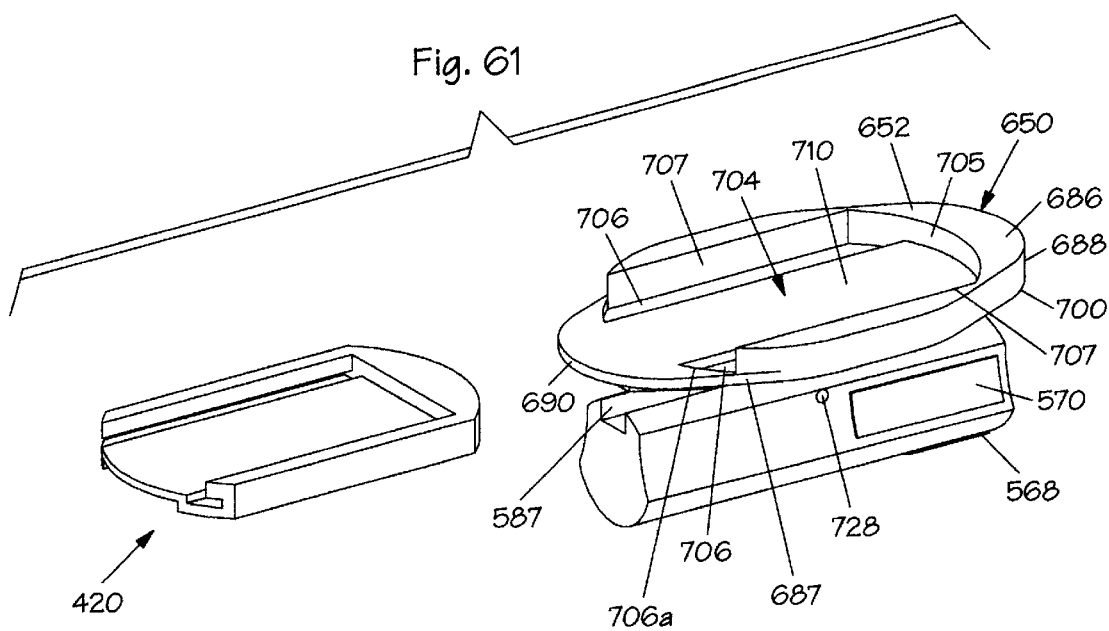
FIG. 61 is an exploded, trimetric view of a holder and one of the coupling adapters as also used in the second embodiment of the present invention as shown in FIGS. 52–55, with the adapter in position to be assembled with the holder.

With reference to FIGS. 58–60, movement of the holders 552 and 554 about their second pivots 728 may be used for climbing or descending. The holders in FIG. 58 are shown in positions that would cause a controlled vehicle or other object. not shown, to travel straight ahead along a level path. The holders in FIG. 59 are shown in positions that would cause a controlled vehicle, not shown, to travel straight ahead but on an ascending path. The holders in FIG. 60 are shown in positions that would cause a controlled vehicle. not shown. to travel straight ahead but on a descending path.

The holders 554 and 556 (FIGS. 56–60) can be placed in various combinations of the positions described thereby to control movement of the controlled vehicle or other object along various other and complex paths. Furthermore, while controlling the motion of the object, the input devices 568 and 570 may be actuated in order to cause the vehicle or other object to accelerate or decelerate, or to fire a weapon, or to cause some other action, for example. It will be understood that pivoting movement of the holders about the axis 220 activates the rotary sensors 752 which in turn activates the signal generators 748, whereas inward and outward pivoting movement of the holders about the second axes 728 activates the rotary sensors 754 which in turn also activates the signal generators 748, thereby to transmit the various signals that are generated.

In essence, the third embodiment 550 of the subject invention allows steering, speed, and related controls with a single hand-held free space apparatus. The subject input control apparatus is highly interactive and is useable to navigate through computer game worlds, flight simulations, and virtual reality environments or as, above stated, is useable in controlling the actual flight of manned or unmanned air, land, water or space-based vehicles.

Although preferred embodiments of the present invention have been shown and described, and alternate embodiments of various features have been described, various modifications and substitutions may be made thereto without departing from the spirit and scope of the invention. Accordingly, it is to be understood that the present invention has been described by way of illustration and not limitation.

What is claimed is:

1. A hand-held input control apparatus, comprising:

a pair of holders each having a hand-grasping portion and a device-mounting portion and being pivotally interconnected by a connector so that the holders are pivotally moveable relative to each other around a pivot axis;

a signal generating device supported by each holder and operable to transmit signals, the connector joining the holders with the hand-grasping portions and the device mounting portions disposed outwardly of the holders and so that the holders can be moved relative to each other when the hand-grasping portions are both grasped individually in the left and right hands of the user and the user moves his or her hands relative to each other.

2. A hand-held input control apparatus, comprising:

a pair of holders;

a connector pivotally joining the holders in X-shaped relation so that the holders are pivotally moveable relative to each other around a pivot axis into and out of overlying and X-shaped positions when the user grasps the holders and moves his or her hands relative to each other; and an input control element supported by each holder and engageable by a finger of a user's hand holding the holder.

3. A hand-held input control apparatus, comprising:

a pair of hand-held holders positioned in opposed relation to each other, a connector pivotally interconnecting the holders for movement in separate planes relative to each other about a pivot axis that is disposed transversely of the planes;

a signal generating device supported by each holder and operable to transmit signals; and an input control element supported by each holder, engageable by a finger of a user's hand holding the holder, and capable of actuating the signal generating device.

4. The apparatus of claim 1, wherein the holders are pivoted about a single axis.

5. The apparatus of claim 1, wherein the holders are pivoted about multiple axes.

6. The apparatus of claim 1, wherein the holders are interconnected by first and second pivots whose axes are disposed transversely of each other.

7. The apparatus of claim 6, wherein said axes are perpendicular to each other.

8. A hand-held input control apparatus, comprising:

a pair of holders interconnected so that they are pivotally moveable relative to each other when the user grasps the holders and moves his or her hands relative to each other around a pivot axis; and a signal generating device supported by each holder and operable to transmit signals, wherein the holders are interconnected by a first pivot having a first axis disposed transversely of the holders, and wherein the holders are interconnected by second pivots each having a second axis disposed transversely of the first axis, said second axes being parallel to each other.

9. A hand-held input control apparatus, comprising:

a pair of pivotally interconnected handles pivotally moveable relative to each other when the user grasps the handles and moves his or her hands relative to each other;

an electronic device supported by each handle and operable to transmit signals during pivotal movement of the handles;

an input control element supported by each handle, engageable by a finger of a user's hand holding the handle, and capable of actuating the electronic device, the handles being interconnected by a first pivot having a first axis disposed transversely of the handles, and the handles being interconnected by second pivots each having a second axis disposed transversely of the first axis, said second axes being parallel to each other.

10. A hand-held input control apparatus, comprising:

first and second handles each including a hand-grasping portion and a device-mounting portion;

an input control device mounted on the device mounting portion of each handle, and a connector joining the handles with the hand-grasping portions and the input control devices disposed outwardly of the handles and so that the handles can be moved relative to each other when the hand-grasping portions are individually grasped in the left and right hands of the user and the user moves his or her hands relative to each other.

11. The apparatus of claim 10, wherein the connector includes a pivot having an axis about which said relative movement of the handles occurs.

12. The apparatus of claim 10, wherein the connector includes multiple pivots each having an axis about which said relative movement of the handles occurs.

13. The apparatus of claim 12, wherein one of said multiple pivots has a first axis that is disposed transversely of the handles; and wherein another of said multiple pivots has a second axis that is disposed transversely of the first axis.

14. The apparatus of claim 13, wherein the connector includes a connecting mechanism that provides first and second coupling units respectively connected to the first and second handles and being pivotally interconnected for relative pivotal movement about said first axis;

wherein the connecting mechanism includes first and second adapters respectively attached to the first and second coupling units; and wherein the first and second handles are respectively pivotally connected to the first and second adapters for pivotal movement of each handle relative to its adapter about its respective second axis.

15. The apparatus of claim 14, wherein the second axes are perpendicular to the first axis.

16. A hand-held input control apparatus comprising, a pair of holders;

a connector having multiple pivots including a first pivot interconnecting the holders so that they are pivotally interconnected in X-shaped relation and so that the holders are moveable relative to each other when the user grasps a holder in each hand and rotates his or her arms about their longitudinal axes;

the connector including a second pivot for each holder, each second pivot having a second axis about which its respective holder pivots when the user grasps a holder in each hand and tilts his or her hands toward or away from each other; and an electronic device supported by each holder and operable to transmit signals.

17. The apparatus of claim 16, wherein the second axes are perpendicular to the first axis.

18. The apparatus of claim 16, wherein the holders are first and second holders, wherein the connector includes a connecting mechanism that provides first and second coupling units respectively connected to the first and second holders and being pivotally interconnected for relative pivotal movement about said first axis;

wherein the connecting mechanism includes first and second adapters respectively attached to the first and second coupling units, wherein the first and second holders are respectively pivotally connected to the first and second adapters for pivotal movement of each holder relative to its adapter about its respective second axis.

19. The apparatus of claim 16, wherein the holders are pivoted about the first axis in an X-shaped relation.

20. The apparatus to claim 16, wherein the holders are pivoted about their respective second axes in a teeter-totter relation.

21. The apparatus of claim 16, wherein the holders are pivoted about the first axis in an X-shaped relation, wherein the holders are pivoted about their respective second axes in a teeter-totter relation.

22. A hand-held inputting apparatus, comprising:

first and second holders each including a hand-grasping portion having a hand resting surface and a device-mounting portion having a mounting surface;

an input device mounted on the mounting surface of the device mounting portion of each holder and having finger-engaging elements engagable by the fingers of a hand grasping the band-grasping portion; and a connector pivotally joining the holders with the hand-grasping portions and the input control devices disposed outwardly of the holders and so that the holders can be moved relative to each other when the hand-grasping portions are individually grasped in the left and right hands of the user and the user moves his or her hands relative to each other.

23. The apparatus of claims 22, wherein the holders are movable in respective first planes that are perpendicular to said pivot axis.

24. The apparatus of claim 23, wherein each hand resting surface is tangent to a second plane; and wherein the first and second planes are angularly related to each other.

25. The apparatus of claim 23, wherein each hand resting surface is tangent to a second plane; and wherein the first and second planes are parallel to each other.

26. The apparatus of claim 22, wherein each hand-resting surface is flat.

27. The apparatus of claim 22, wherein each hand-resting surface is rounded.

28. The apparatus of claim 22, wherein the hand-grasping portions and the hand-resting surfaces are generally semi-cylindrical.

29. The apparatus of claim 22, wherein the finger-engaging elements are on the fronts of the holders.

30. The apparatus of claim 23, when there is a finger-engaging elements are on the side of each holder.

31. The apparatus of claim 23, wherein the holders have outwardly facing fronts and sides; and where the finger-engaging elements are on the fronts and sides of the holders.

32. A hand-held input control apparatus adapted to be operated using both hands of a user, comprising:

a pair of holders each having a front portion and a back portion and a longitudinal axis and hand-holding portions capable of being held individually in the two hands of a user so that the longitudinal axis of each holder is generally in alignment with the longitudinal axis of the arm of the hand that holds the holder;

a connector interconnecting the holders in back-to-back relation so that the front portions are disposed outwardly and so that the longitudinal axes can be moved into and out of X-shaped relation; and a signal generator mounted on each holder adapted to generate signals during movement of the holders, said connector enabling the holders to be moved through separate arcuate paths between a first position with one of the input devices facing upwardly under the right hand of the user and a second position with the other input device facing upwardly under the left hand of the user while the holders are held in the two hands of the user with said axes remaining in general alignment with the longitudinal axes of the user's respective arms holding the holders.

33. The apparatus of claim 32, wherein the connector interconnects the holders so that the longitudinal axes can be moved into and out of parallel relation with each other.

34. A two-handed input control apparatus comprising:

first and second housings;

a hand-operated input device mounted on each housing, each of the housings having a hand-holding portion enabling it to be held in the hand of a user in such a way that the hand can reach and manipulate the input device mounted thereon;

a first pivot interconnecting the housings for pivotal movement relative to each other when one housing is held in one hand of a user and the other housing is held in the other hand of the user and the housings are pivoted back and forth relative to each other between a first position wherein the first housing and its input device on top of the second housing and a second position wherein the second housing and its input device are on the top of the first housing, whereby the input device selected for the top position is in a convenient position for manipulation;

second pivots interconnecting the housings for pivotal movement relative to each other when one housing is held in one hand of a user and the other housing is held in the other hand of the user and the housings are pivoted back and forth toward and away from each other; and an electronic signal transmitting device in each housing responsive to manipulation of the input devices.

35. A method of controlling equipment with a two-handed, hand-held apparatus which mounts a plurality of control devices for pivotal movement relative to each other, comprising the steps of:

holding the control devices in and between both hands with the fingers of each hand disposed over a control device in a position to manipulate the device:

rotating the hands about the longitudinal axes of their respective arms in the same clockwise or counterclockwise direction and without appreciable bending of the wrists to rotate the devices and place them in various selected positions including positions wherein one device is above the other and side-by-side positions thereby to place one or both devices in the most convenient position for manipulation by the user, and manipulating the devices alternately or simultaneously in said selected positions.

36. The method of claim 35, including the further steps of:

pivoting the hands toward and away from each other about axes perpendicular to said longitudinal axes to move the devices into various other selected positions.

37. A method of inputting data into a computer or other electronic or electro-optical equipment with a two-handed, hand-held apparatus providing a plurality of input devices interconnected for movement relative to each other and one or more sensors responsive to movement of the devices, comprising the steps of:

holding the input devices in and between both hands with fingers of each hand disposed over an input device in a position to manipulate the device;

rotating the hands in the same clockwise or counterclockwise direction without appreciably bending the wrists and while holding the devices to place one device in an uppermost position relative to the other device thereby to actuate said one or more sensors;

and bending the wrists back and forth while holding the devices to move the devices in unison toward and away from each other thereby to actuate said one or more sensors.

38. The method of claim 37, wherein the rotating step is carried out without appreciable bending the wrists.

39. The method of claim 37, wherein the bending step is carried out without rotating the hands.

40. The method of claim 37, wherein the rotating and bending steps are carried out simultaneously.

41. A method of inputting data into a computer or other electronic or electro-optical equipment with a two-handed, hand-held apparatus providing a plurality of input devices interconnected for pivotal movement relative to each other about a first axis wherein the devices move in X-shaped relation to each other and about second axes wherein the devices move in a teeter-totter relation to each other and also providing first and second sensors respectively responsive to movement about the first and second axes. comprising the steps of:

holding the input devices in and between both hands with fingers of each hand disposed over an input device in a position to manipulate the device;

pivoting the devices in the same clockwise or counterclockwise direction about the first axis to actuate a first sensor;

and pivoting the devices toward and away from each other about the second axes to actuate a second sensor or sensors.

42. The method of claim 41, wherein the devices are pivoted about the first axis without pivoting the devices about the second axes.

43. The method of claim 41, wherein the devices are pivoted about the second axes without pivoting the devices about the first axes.

44. The method of claim 41, wherein the devices are pivoted about the first and second axes simultaneously.

\* \* \* \* \*